(12) United States Patent
Kitamura et al.

(10) Patent No.: US 7,835,549 B2
(45) Date of Patent: Nov. 16, 2010

(54) LEARNING METHOD OF FACE CLASSIFICATION APPARATUS, FACE CLASSIFICATION METHOD, APPARATUS AND PROGRAM

(75) Inventors: Yoshiro Kitamura, Ashigarakami-gun (JP); Sadato Akahori, Ashigarakami-gun (JP); Kensuke Terakawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1011 days.

(21) Appl. No.: 11/368,469

(22) Filed: Mar. 7, 2006

(65) Prior Publication Data

US 2006/0215905 A1 Sep. 28, 2006

(30) Foreign Application Priority Data

Mar. 7, 2005 (JP) .............................. 2005-062643
Mar. 7, 2005 (JP) .............................. 2005-062644

(51) Int. Cl.
 *G06K 9/00* (2006.01)
 *G06K 9/62* (2006.01)
(52) U.S. Cl. ...................................... 382/118; 382/224
(58) Field of Classification Search ................ 382/115, 382/118
 See application file for complete search history.

(56) References Cited

U.S. PATENT DOCUMENTS

| 6,144,755 | A * | 11/2000 | Niyogi et al. ................. 382/118 |
| 6,885,760 | B2 | 4/2005 | Yamada et al. |
| 2001/0053292 | A1* | 12/2001 | Nakamura ..................... 396/661 |
| 2003/0108244 | A1* | 6/2003 | Li et al. ........................ 382/227 |
| 2005/0100195 | A1 | 5/2005 | Li |

FOREIGN PATENT DOCUMENTS

| JP | 5-282457 | A | 10/1993 |
| JP | 10-232934 | A | 9/1998 |
| JP | 2001-216515 | A | 8/2001 |
| JP | 2001-250121 | A | 9/2001 |
| JP | 2003-015816 | A | 1/2003 |
| JP | 2004-038937 | A | 2/2004 |
| JP | 2004-178402 | A | 6/2004 |
| WO | 03/088131 | A2 | 10/2003 |

OTHER PUBLICATIONS

Rowley et al., "Neural Network-Based Face Detection", PAMI, pp. 1-27, Jan. 1998.
Lienhart et al., "An Extended Set of Haar-like Features for Rapid Object Detection", ICIP 2002, vol. 1, pp. 900-903, Sep. 2002.
Lao et al., "Fast Omni-Directional Face Detection" Meeting on Image Recognition and Understanding, pp. 11271-11276, Jul. 2004.
Decision of Rejection, dated May 11, 2010, issued in corresponding JP Application No. 2005-062644, 5 pages with partial English translation.

* cited by examiner

*Primary Examiner*—Vu Le
*Assistant Examiner*—Alex Liew
(74) *Attorney, Agent, or Firm*—Sughrue Mion, PLLC

(57) ABSTRACT

A plurality of different facial images is used to cause a face classification apparatus to learn a characteristic feature of a face by using a machine-learning method. Each of the facial images includes a face which has the same direction and the same angle of inclination as those of a face included in each of the other facial images and each of the facial images is limited to an image of a specific facial region. For example, the facial region is a predetermined region including only a specific facial part other than a region below an upper lip to avoid an influence of a change in facial expressions. Alternatively, if the apparatus is used to detect a frontal face and to perform refined detection processing on the extracted face candidate, a region including only an eye or eyes, a nose and an upper lip is used as the facial region.

26 Claims, 13 Drawing Sheets

LEARNING METHOD OF FACE CLASSIFICATION APPARATUS, FACE CLASSIFICATION METHOD, APPARATUS AND PROGRAM

BACKGROUND OF THE INVENTION

1. Field of the Invention

The present invention relates to a learning method of a face classification apparatus for classifying whether a digital image is a facial image. The present invention also relates to a face classification method and apparatus and a program for the face classification apparatus.

2. Description of the Related Art

Conventionally, when snapshots are taken with a digital camera, the skin colors of persons in photographs are corrected by checking color distribution in the facial regions of the persons in images. Further, when a digital video image is captured by a digital video camera in a monitor system, a person in the digital image is recognized. In these cases, it is necessary to detect a facial region, which corresponds to the face of a person, in the digital image. Therefore, various methods have been proposed to classify whether an image represents a face.

For example, in the method proposed in Henry A. Rowley et al., "Neural Network-Based Face Detection", vol. 20, No. 1, pp. 23-38, January 1998, luminance values, which are used as feature values in face detection, are normalized. Then, judgment is made as to whether an image is a facial image with reference to a result of learning about faces, which is obtained by using a technique of neural network learning. Further, in the method proposed in Rainer Lienhart and Jochen Maydt, "An Extended Set of Haar-like Features for Rapid Object Detection", IEEE ICIP 2002, Vol. 1, pp. 900-903, September 2002, high frequency components, such as edges, in an image are obtained as feature values for detecting an object. Then, the feature values are normalized. Further, judgment is made as to whether an image is an image representing the object with reference to a result of learning about the feature values, which is obtained by using a machine-learning method called "Boosting". In both methods, the feature values which are used for detecting an object, such as a face, are normalized. Therefore, it is possible to accurately classify whether an image is an image representing the object.

Further, methods for classifying classification object images into images which represent a predetermined object and images which do not represent the predetermined object are also proposed. In the methods, a plurality of classifiers is obtained in advance by learning a feature value calculated in each of a multiplicity of sets of sample images by using a machine-learning method. Each of the multiplicity of sets of sample images includes a plurality of sample images which are recognized as images representing the predetermined object and a plurality of sample images which are recognized as images which do not represent the predetermined object. The plurality of classifiers outputs standard values for classifying the classification object images based on received feature values. If the weighted sum of the standard values output from the plurality of classifiers exceeds a predetermined threshold value, the classification object image is classified as an image representing the predetermined object (please refer to U.S. Patent Application Publication No. 20050100195).

Further, another method for classifying a classification object image as an image representing a face is proposed. In this method, a plurality of weak classifiers for classifying, based on a received feature value, whether the classification object image is an image representing a face is provided. The plurality of weak classifiers is obtained in advance by learning a feature value calculated in each of a multiplicity of sets of sample images by using a machine-learning method. Each of the multiplicity of sets of sample images includes a plurality of sample images which are recognized as images representing faces and a plurality of sample images which are recognized as images which do not represent faces. In this method, the plurality of weak classifiers is linearly combined to form a cascade structure. If a classification object image is classified as an image representing a face in each of all the weak classifiers, the classification object image is classified as an image representing a face (please refer to Shihong LAO, et al., "Fast Omni-Directional Face Detection", Meeting of Image Recognition and Understanding (MIRU2004), pp. II271-II276, July 2004).

If facial images are used as the sample images and learning is performed by using the methods disclosed in U.S. Patent Application Publication No. 20050100195 and "Fast Omni-Directional Face Detection", it is possible to efficiently classify whether the classification object image is an image representing a face.

Further, the sample images are transformed stepwise by enlarging/reducing or rotating them stepwise. Then, the sample images obtained in each step of transformation are used for learning. Therefore, it is possible to classify whether the classification object image is an image representing a face even if the face represented by the classification object image is reduced at various magnification factors or even if the face is slightly rotated.

Here, when a plurality of classifiers or a plurality of weak classifiers is obtained in advance by using the machine-learning method, facial images including faces which have the same angle of inclination and the same direction (with respect to the direction of headshake) are used (please refer to FIG. 7 in "Fast Omni-Directional Face Detection"). Since the facial images including faces which have the same angle of inclination and the same direction, as described above, are used as sample images, each facial part such as an eye or eyes, a nose or a mouth or a facial contour appears at a substantially same position in all of the sample images representing faces. Therefore, a characteristic feature which is common to the facial patterns can be easily detected and the accuracy in classification can be improved.

Further, when the facial images including faces which have the same angle of inclination and the same direction are used as the sample images for learning, as described above, the direction of the faces in the sample images for learning is the direction of faces which can be classified by the face classification apparatus which has learned by using the sample images. Therefore, when a user wishes to detect faces in various directions so as to detect a face in an arbitrary direction, a plurality of face classification means (apparatuses) for classifying whether a classification object image is an image representing a face by using a classification method is prepared. The plurality of face classification means is prepared for each direction of the faces. Further, the plurality of face classification means is used simultaneously.

Generally, a characteristic region of an image which should be learned by the face classification apparatus is not always the same. Particularly, the characteristic region is different according to the direction of a face to be classified by the face classification apparatus and a type of processing in face detection processing in which the face classification apparatus is used.

For example, if the face classification apparatus is an apparatus for classifying profile faces (side-view faces), it is important to learn a characteristic feature of the profile faces that a background region is relatively large. Alternatively, if the face classification apparatus is an apparatus for detecting frontal faces and if the face classification apparatus is used for roughly detecting a face candidate in face detection processing, it is important to emphasize the robustness of the apparatus. Therefore, it is important to cause the face classification apparatus to learn a simplest common characteristic feature of frontal faces rather than a subtle characteristic feature of each facial part. The simplest common characteristic feature is that the shape of a face is round.

However, when facial images which have the same angle of inclination and the same direction are used as sample images for learning, as described above, since only the angles of inclination and the directions of the images are the same, characteristic regions of the images, which should be learned, are not always included in the sample images in an appropriate manner. Further, a different characteristic feature of an image tends to be included in each of the plurality of sample images. Therefore, it is difficult to cause the face classification apparatus to accurately learn a characteristic feature which should be primarily learned.

SUMMARY OF THE INVENTION

In view of the foregoing circumstances, it is an object of the present invention to provide a face classification apparatus which has accurately learned a characteristic feature which should be primarily learned. It is also an object of the present invention to provide a program for causing an apparatus to function as the face classification apparatus. It is also an object of the present invention to provide a method of learning of a face classification apparatus to obtain the face classification apparatus which has accurately learned the characteristic feature which should be primarily learned.

It is said that approximately 30% of facial images are images, such as snapshots, representing faces which have various facial expressions. When the face classification apparatus, as described above, is used to detect faces in general images, such as snapshots, which include faces with various facial expressions, the accuracy in detection is lower compared with detection of faces in images, such as photographs for certificates, images obtained by a monitor camera or images for authentication, which include faces which have substantially the same facial expressions. Therefore, there is a problem that the face classification apparatus which has learned characteristic features by using the method of learning according to the related art is influenced by a change in facial expressions.

Therefore, it is another object of the present invention to provide a face classification apparatus which is not influenced by a change in facial expressions. It is also an object of the present invention to provide a program for causing an apparatus to function as the face classification apparatus. It is also an object of the present invention to provide a method of learning of a face classification apparatus to obtain the face classification apparatus which is not influenced by a change in facial expressions.

A first learning method of a face classification apparatus according to the present invention is a learning method for causing a face classification apparatus to learn a characteristic feature of faces, wherein the face classification apparatus is an apparatus for classifying whether an input image is a facial image including a face which has a predetermined direction and a predetermined angle of inclination, wherein the characteristic feature of faces is learned by using a machine-learning method using a plurality of facial images for learning, which are different from each other, and each of which includes a face has the predetermined direction and the predetermined angle of inclination, and wherein the plurality of facial images for learning includes only images of a predetermined facial region, determined based on at least one of the predetermined direction and the type of processing in face detection processing in which the face classification apparatus is used.

A first learning apparatus of a face classification apparatus according to the present invention is a learning apparatus for causing a face classification apparatus to learn a characteristic feature of faces, wherein the face classification apparatus is an apparatus for classifying whether an input image is a facial image including a face which has a predetermined direction and a predetermined angle of inclination, wherein the characteristic feature of faces is learned by using a machine-learning method using a plurality of facial images for learning, which are different from each other, and each of which includes a face which has the predetermined direction and the predetermined angle of inclination, and wherein the plurality of facial images for learning includes only images of a predetermined facial region, determined based on at least one of the predetermined direction and the type of processing in face detection processing in which the face classification apparatus is used.

A first program for learning of a face classification apparatus according to the present invention is a program that causes a computer to perform processing for causing a face classification apparatus to learn a characteristic feature of faces, wherein the face classification apparatus is an apparatus for classifying whether an input image is a facial image including a face which has a predetermined direction and a predetermined angle of inclination, and wherein the characteristic feature of faces is learned by using a machine-learning method using a plurality of facial images for learning, which are different from each other, and each of which includes a face which has the predetermined direction and the predetermined angle of inclination, and wherein the plurality of facial images for learning includes only images of a predetermined facial region, determined based on at least one of the predetermined direction and the type of processing in face detection processing in which the face classification apparatus is used.

A first face classification method according to the present invention is a face classification method using a face classification apparatus for classifying whether an input image is a facial image including a face which has a predetermined direction and a predetermined angle of inclination, wherein the face classification apparatus learns a characteristic feature of faces by using a machine-learning method using a plurality of facial images for learning, which are different from each other, and each of which includes a face which has the predetermined direction and the predetermined angle of inclination, and wherein the plurality of facial images for learning includes only images of a predetermined facial region, determined based on at least one of the predetermined direction and the type of processing in face detection processing in which the face classification apparatus is used.

A first face classification apparatus according to the present invention is a face classification apparatus for classifying whether an input image is a facial image including a face which has a predetermined direction and a predetermined angle of inclination, wherein a characteristic feature of faces is learned by using a machine-learning method using a plurality of facial images for learning, which are different from each other, and each of which includes a face which has the predetermined direction and the predetermined angle of inclination, and wherein the plurality of facial images for learning includes only images of a predetermined facial region, determined based on at least one of the predetermined direction and the type of processing in face detection processing in which the face classification apparatus is used.

A first program for face classification according to the present invention is a program that causes a computer to function as a face classification apparatus for classifying whether an input image is a facial image including a face which has a predetermined direction and a predetermined angle of inclination, wherein the face classification apparatus learns a characteristic feature of faces by using a machine-learning method using a plurality of facial images for learning, which are different from each other, and each of which includes a face which has the predetermined direction and the predetermined angle of inclination, and wherein the plurality of facial images for learning includes only images of a predetermined facial region, determined based on at least one of the predetermined direction and the type of processing in face detection processing in which the face classification apparatus is used.

Here, if the predetermined direction is a profile direction, the predetermined facial region may be a region including an entire facial contour.

Further, if the predetermined direction is a frontal direction, and if the type of processing is preprocessing in face detection processing including the preprocessing for extracting a face candidate and post-processing for performing refined detection processing on the extracted face candidate, the predetermined facial region may be a region including an entire facial contour.

If the predetermined direction is a frontal direction, and if the type of processing is post-processing in face detection processing including preprocessing for extracting a face candidate and the post-processing for performing refined detection processing on the extracted face candidate, the plurality of facial images for learning may be an image or images of a region including only both eyes, a nose and an upper lip and an image or images of a region including an entire facial contour.

If the predetermined direction is a frontal direction, and if the type of processing is post-processing in face detection processing including preprocessing for extracting a face candidate and the post-processing for performing refined detection processing on the extracted face candidate, the predetermined facial region may be a region including only both eyes, a nose and an upper lip.

If the predetermined direction is a frontal direction, and if the type of processing is post-processing in face detection processing including preprocessing for extracting a face candidate and the post-processing for performing refined detection processing on the extracted face candidate, the predetermined facial region may be a region including only both eyes and a nose.

A second learning method of a face classification apparatus according to the present invention is a learning method for causing a face classification apparatus to learn a characteristic feature of faces, wherein the face classification apparatus is an apparatus for classifying whether an input image is a facial image including a face which has a predetermined direction and a predetermined angle of inclination, and wherein the characteristic feature of faces is learned by using a machine-learning method using a plurality of facial images for learning, which are different from each other, and each of which includes a face which has the predetermined direction and the predetermined angle of inclination, and wherein the plurality of facial images for learning includes at least one of an image or images of a region including only an eye or eyes and a nose and an image or images of a region including only an eye or eyes, a nose and an upper lip and does not include any image of another region.

A second learning apparatus of a face classification apparatus according to the present invention is a learning apparatus for causing a face classification apparatus to learn a characteristic feature of faces, wherein the face classification apparatus is an apparatus for classifying whether an input image is a facial image including a face which has a predetermined direction and a predetermined angle of inclination, and wherein the characteristic feature of faces is learned by using a machine-learning method using a plurality of facial images for learning, which are different from each other, and each of which includes a face which has the predetermined direction and the predetermined angle of inclination, and wherein the plurality of facial images for learning includes at least one of an image or images of a region including only an eye or eyes and a nose and an image or images of a region including only an eye or eyes, a nose and an upper lip and does not include any image of another region.

A second program for learning of a face classification apparatus according to the present invention is a program that causes a computer to perform processing for causing a face classification apparatus to learn a characteristic feature of faces, wherein the face classification apparatus is an apparatus for classifying whether an input image is a facial image including a face which has a predetermined direction and a predetermined angle of inclination, wherein the characteristic feature of faces is learned by using a machine-learning method using a plurality of facial images for learning, which are different from each other, and each of which includes a face which has the predetermined direction and the predetermined angle of inclination, and wherein the plurality of facial images for learning includes at least one of an image or images of a region including only an eye or eyes and a nose and an image or images of a region including only an eye or eyes, a nose and an upper lip and does not include any image of another region.

A second face classification method according to the present invention is a face classification method using a face classification apparatus for classifying whether an input image is a facial image including a face which has a predetermined direction and a predetermined angle of inclination, wherein the face classification apparatus learns a characteristic feature of faces by using a machine-learning method using a plurality of facial images for learning, which are different from each other, and each of which includes a face which has the predetermined direction and the predetermined angle of inclination, and wherein the plurality of facial images for learning includes at least one of an image or images of a region including only an eye or eyes and a nose and an image or images of a region including only an eye or eyes, a nose and an upper lip and does not include any image of another region.

A second face classification apparatus according to the present invention is a face classification apparatus for classifying whether an input image is a facial image including a face which has a predetermined direction and a predetermined angle of inclination, wherein a characteristic feature of faces is learned by using a machine-learning method using a plurality of facial images for learning, which are different from each other, and each of which includes a face which has the predetermined direction and the predetermined angle of inclination, and wherein the plurality of facial images for learning includes at least one of an image or images of a region including only an eye or eyes and a nose and an image or images of a region including only an eye or eyes, a nose and an upper lip and does not include any image of another region.

A second program for face classification according to the present invention is a program that causes a computer to function as a face classification apparatus for classifying whether an input image is a facial image including a face which has a predetermined direction and a predetermined angle of inclination, wherein the face classification apparatus learns a characteristic feature of faces by using a machine-learning method using a plurality of facial images for learning, which are different from each other, and each of which includes a face which has the predetermined direction and the predetermined angle of inclination, and wherein the plurality of facial images for learning includes at least one of an image or images of a region including only an eye or eyes and a nose and an image or images of a region including only an eye or eyes, a nose and an upper lip and does not include any image of another region.

Here, the plurality of facial images for learning may include only images of a region including only an eye or eyes and a nose.

Further, the plurality of facial images for learning may include only images of a region including only an eye or eyes, a nose and an upper lip.

Further, the plurality of facial images for learning may include only an image or images of a region including only an eye or eyes and a nose and an image or images of a region including only an eye or eyes, a nose and an upper lip.

In the present invention, it is preferable that the facial region and the region are rectangular regions.

In the present invention, the face classification apparatus may be formed by linearly combining a plurality of weak classifiers which are different from each other.

In the present invention, at least the facial images for learning, as described above, should be used as images for learning. Needless to say, a non-facial image or images for learning may be used as the images for learning in addition to the facial images for learning.

In the present invention, the machine-learning method may be a method such as boosting and neural network, for example.

The programs of the present invention may be provided through telecommunication lines. Alternatively, the programs may be provided by being recorded on a computer readable recording medium. Those who are skilled in the art would know that computer readable recording media are not limited to any specific type of device, and include, but are not limited to: floppy disks, CD's RAM'S, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

Here, the phrase "facial image for learning" refers to a sample image which is recognized as an image representing a face, and which is used for learning. The phrase "non-facial image for learning" refers to a sample image which is recognized as an image which does not represent a face, and which is used for learning.

The expression "each of which includes a face which has the predetermined direction and the predetermined angle of inclination" does not refer only to a state in which the direction of the face and the angle of inclination of the face are exactly the same as the predetermined direction and the predetermined angle of inclination. The direction of the face and the angle of inclination of the face may be slightly shifted from the predetermined direction and the predetermined angle of inclination. For example, the angle of inclination of the face may be shifted by a rotation angle of ±15 degrees on an image plane.

The "weak classifier" is a classification means (module) which has a correct answer rate of 50% or higher. The expression "formed by linearly combining a plurality of weak classifiers" refers to a structure in which the weak classifiers are linearly connected to each other, and in which if an object image is classified as a facial image by a weak classifier, processing goes to processing by a next weak classifier, or if the object image is classified as a non-facial image by the weak classifier, classification processing is stopped. If the object image is classified as a facial image by the last weak classifier, the object image is finally classified as a facial image.

The "face" includes an eye or eyes, a nose and a mouth as composition parts, and the mouth includes an upper lip and a lower lip. Ears are not included in the "composition parts". Therefore, it is not necessary that the facial region of a facial image for learning include an ear or ears. Further, it is not necessary that the "eye or eyes" include an eyebrow or eyebrows.

The "facial contour" is a contour excluding the contour of a head (including an occiput) and the contour of a neck. If the image is an image of a frontal face, the "facial contour" is a contour formed by connecting a right temple, a chin and a left temple. If the image is an image of a profile face, the "facial contour" is a contour formed by connecting a forehead, a nose and a chin.

According to the first learning method of the face classification apparatus according to the present invention, the plurality of facial images for learning, each including a face which has the same direction and the same angle of inclination, is used. Further, only the facial images for learning, each including a predetermined facial region, are used for each of cases in which the characteristic regions of the images, which should be learned, are different from each other. Therefore, it is possible to appropriately include a characteristic region of the image which should be learned in the facial image for learning. Further, it is possible to prevent a plurality of facial images for learning from including different characteristic features from each other. Therefore, it is possible to obtain a face classification apparatus which has accurately learned the characteristic feature of the image, which should be primarily learned.

According to the second leaning method of the face classification apparatus according to the present invention, the plurality of facial images for learning, each including a face which has the same direction and the same angle of inclination, is used. Further, only the facial images for learning, each including a predetermined facial region, which is a region including only specific facial parts other than a region below the upper lip. Therefore, it is possible to appropriately include a characteristic region of the face in the facial image for learning and to exclude the vicinity of a chin. The vicinity of the chin is a region which is easily transformed by a change in facial expressions. Further, it is possible to prevent the plurality of facial images for learning from including different characteristic features from each other. Since learning is performed using the facial images for learning, as described above, it is possible to obtain a face classification apparatus which is not influenced by a change in facial expressions.

DESCRIPTION OF THE PREFERRED EMBODIMENTS

Hereinafter, embodiments of the present invention will be described with reference to the attached drawings. First, a face detection system according to a first embodiment of the present invention will be described.

Figure 1:
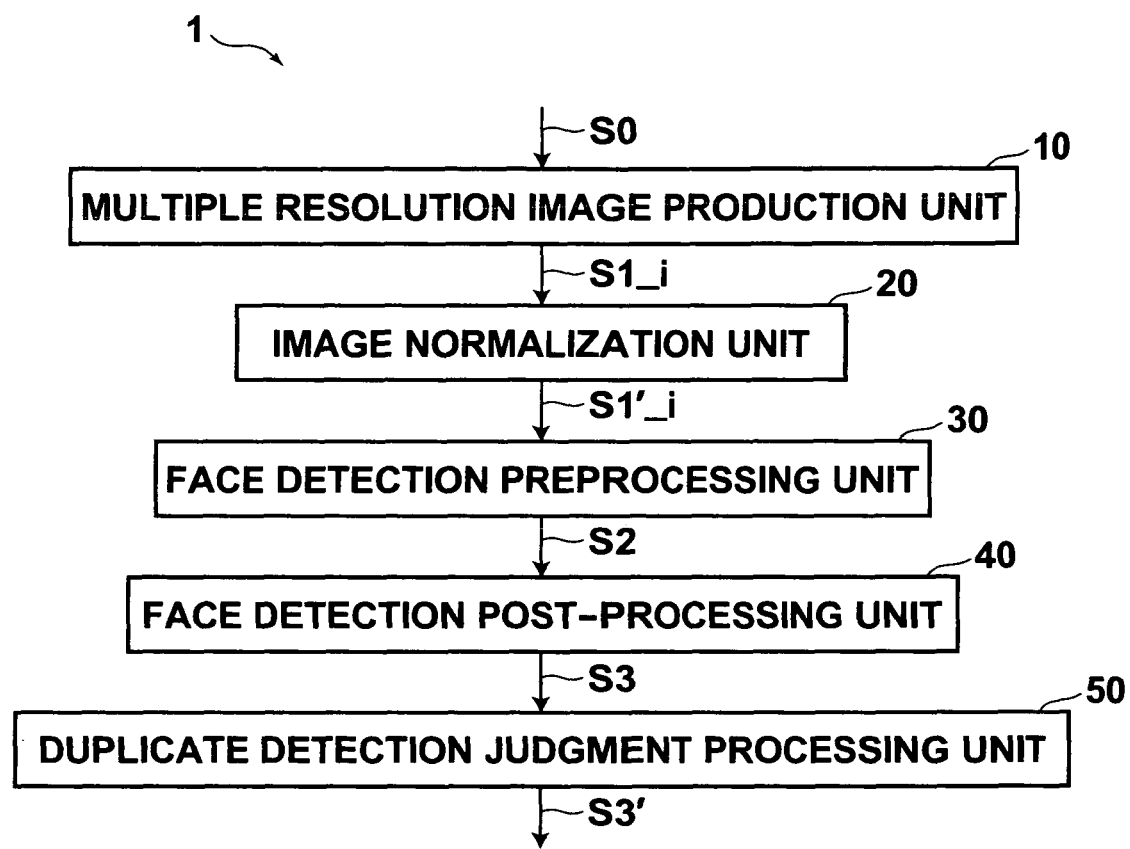
FIG. 1 is a block diagram illustrating the configuration of a face detection system 1.

FIG. 1 is a schematic block diagram illustrating the configuration of a face detection system according to the first embodiment of the present invention. The face detection system detects a face in a digital image, based on a classification result obtained by the classifier, regardless of the position of the face, the size of the face, the direction of the face or the angle of rotation of the face. As illustrated in FIG. 1, the face detection system 1 includes a multiple resolution image production unit 10. The multiple resolution image production unit 10 produces a plurality of images (reduced images) $S1\_i$ (i=1, 2, 3 . . . ) at different resolutions by representing an input image S0 at multiple resolutions. The face detection system 1 also includes an image normalization unit 20. The image normalization unit 20 normalizes luminance variance in each of the multiple resolution images $S1\_i$ to obtain a normalized multiple resolution image $S1'\_i$. The face detection system 1 also includes a face detection preprocessing unit 30 for extracting a face candidate S2 by roughly performing face detection processing on each of the multiple resolution images $S'\_i$. The face detection system 1 also includes a face detection post-processing unit 40. The face detection post-processing unit 40 performs highly accurate face detection processing on face candidate neighboring images to obtain a face S3 based on the face candidate S2. The face detection system 1 also includes a duplicate detection judgment processing unit 50. If duplicate faces S3 are detected in a plurality of multiple resolution images, the duplicate detection judgment processing unit 50 reduces the number of the duplicate faces S3 to one to obtain a face S3'.

Figure 2:
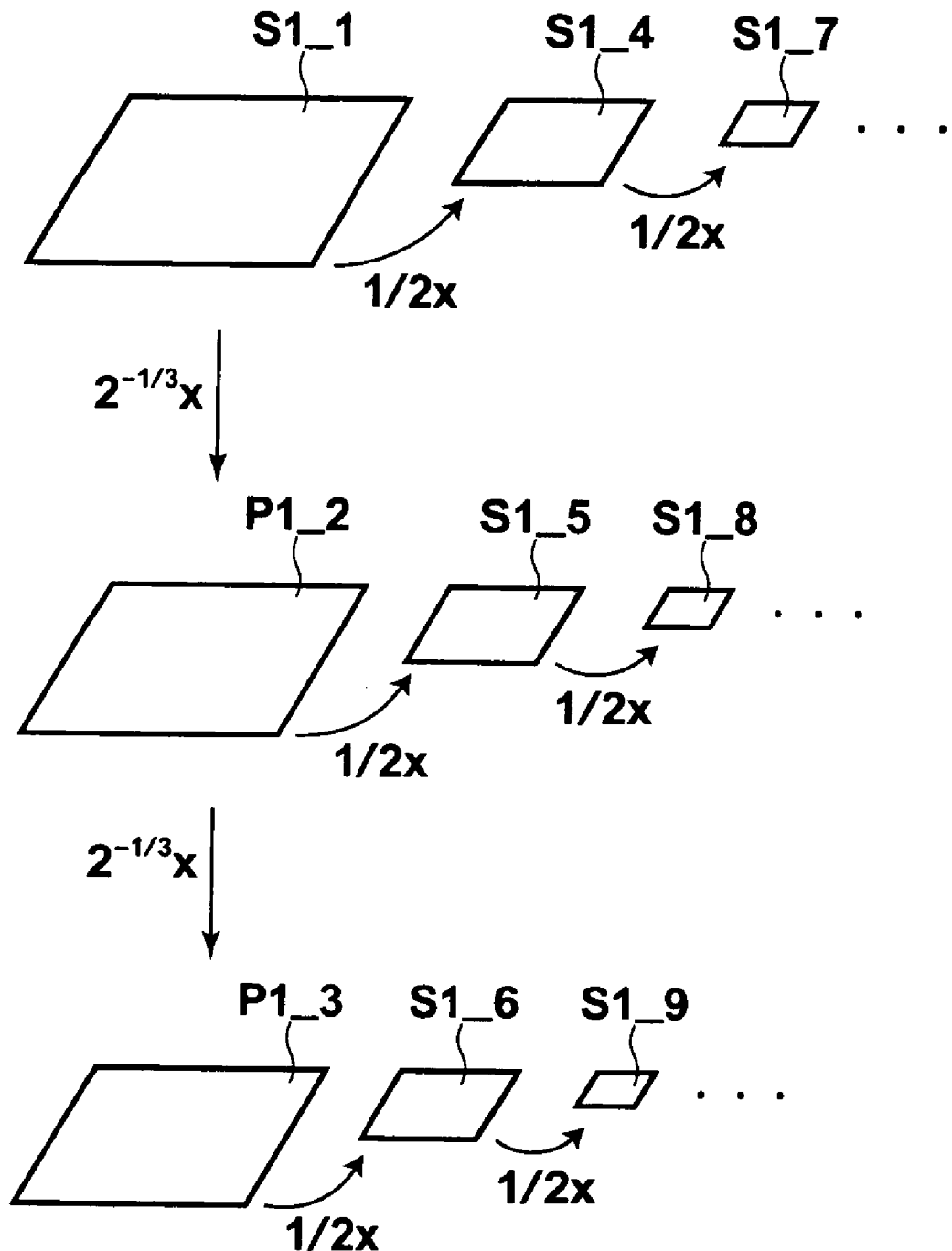
FIG. 2 is a diagram illustrating the process of producing multiple resolution images.

The multiple resolution image production unit 10 produces an image S1 by changing the image size (resolution) of the input image S0, on which face detection will be performed, to a predetermined size. The predetermined size is a size of a rectangle, of which the shorter side is 416 pixels, for example. Further, the image S is used as a base image and a plurality of images $S1\_i$ at different resolutions is produced. Normally, the size of a face included in the input image is unknown. However, the size (image size) of a face on which face detection processing is performed needs to be a predetermined size because of the structure of the classifier, which will be described later. Therefore, a partial image which has a predetermined size must be extracted from each of images, each having a different resolution from each other, to classify whether the partial image is a facial image or a non-facial image. Specifically, the image S1 is used as a base image $S1\_1$, as illustrated in FIG. 2. Then, the image $S1\_1$ is reduced at a magnification factor of 2 to the power $-\frac{1}{3}$ to obtain an image $S1\_2$. Then, the image $S1\_2$ is reduced at a magnification factor of 2 to the power $-\frac{1}{3}$ to obtain an image $S1\_3$ (in other words, the base image $S1\_1$ is reduced at a magnification factor of 2 to the power $-\frac{2}{3}$). After the images $S1\_2$ and $S1\_3$ are produced, a reduced image of each of the images $S1\_1$, $S1\_2$ and $S1\_3$ is produced by reducing each of the images $S1\_1$, $S1\_2$ and $S1\_3$ at a magnification factor of ½. Further, a reduced image is produced from each of the reduced images by further reducing each of the reduced images at a magnification factor of ½ . . . . The processing for reducing each of the reduced images at a magnification factor of ½ is repeated to produce a predetermined number of reduced images. Accordingly, a plurality of reduced images can be produced by mainly performing reduction processing at a magnification factor of ½. The processing for reducing the image size at the magnification factor of ½ does not require interpolation of luminance signals. Accordingly, a plurality of images, of which the resolutions are sequentially reduced from the resolution of the base image at a magnification factor of 2 to the power $-\frac{1}{3}$, can be produced at high speed. For example, if the size of the image $S1\_1$ is a size of a rectangle, of which the shorter side is 416 pixels, the size of each of the images $S1\_2$, $S1\_3$, . . . is a size of a rectangle, of which the shorter side is 330 pixels, 262 pixels, 208 pixels, 165 pixels, 131 pixels, 104 pixels, 82 pixels, 65 pixels, . . . , respectively. Accordingly, images, of which the resolutions are sequentially reduced at a magnification factor of 2 to the power $-\frac{1}{3}$, can be produced. When the images are produced without interpolating luminance signals, as described above, the images tend to carry the original characteristic feature of image patterns. Therefore, this method is advantageous in that the accuracy in face detection processing can be improved.

The image normalization unit 20 normalizes luminance variance in each of the multiple solution images $S1\_i$ by performing gradation conversion on the multiple solution images $S1\_i$ so that the luminance variance reaches a predetermined level. The image normalization unit 20 normalizes the luminance variance so as to improve the accuracy in face detection processing which will be performed later. The image normalization unit 20 obtains normalized multiple resolution images S1'_i.

Figure 3:
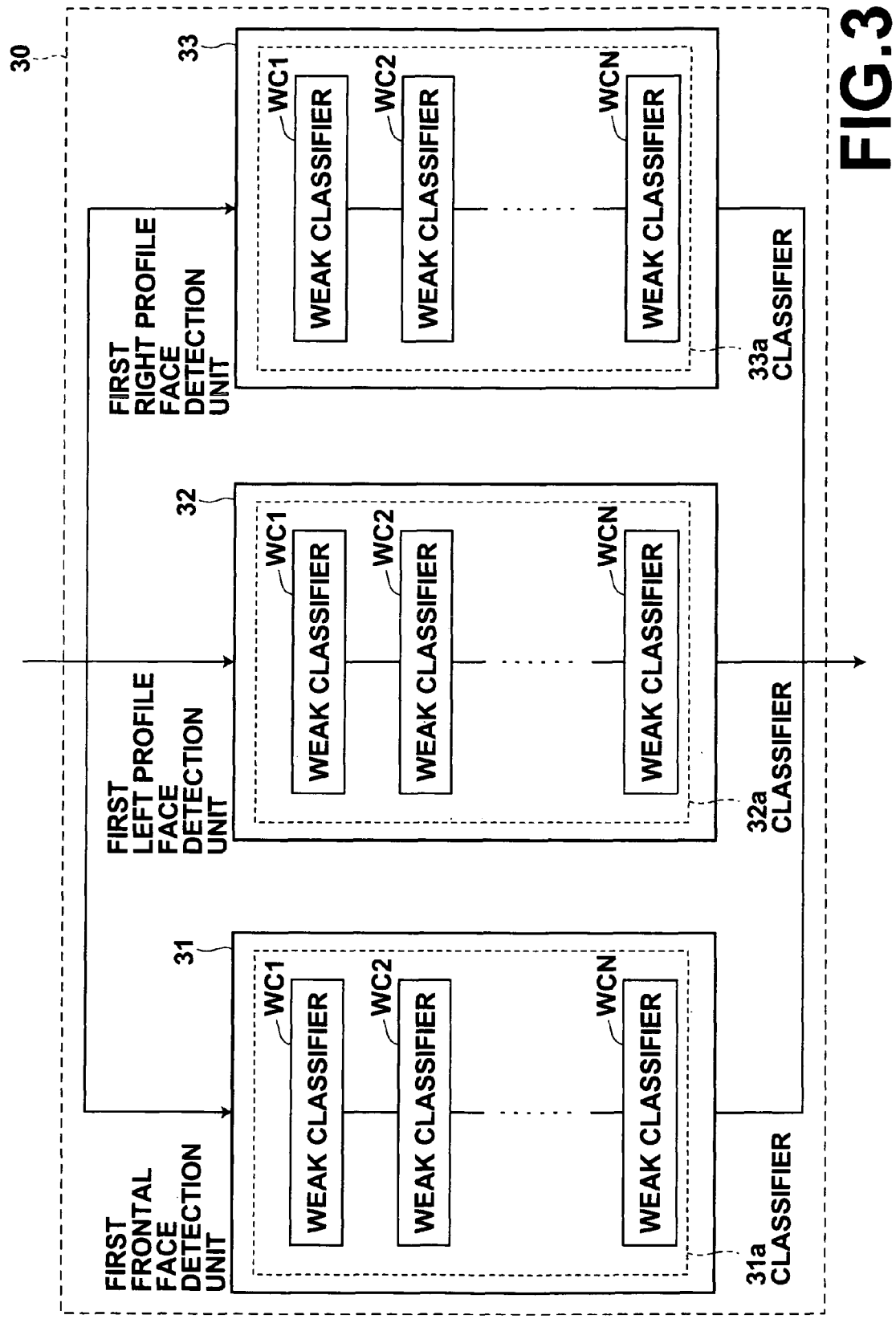
FIG. 3 is a block diagram illustrating the configuration of a face detection preprocessing unit 30.

The face detection preprocessing unit 30 performs relatively rough face detection processing on each of the normalized multiple resolution images S1'_i, obtained by the image normalization unit 20, at high speed. The face detection preprocessing unit 30 temporarily extracts a face candidate S2 from each of the normalized multiple resolution images S1'_i. FIG. 3 is a block diagram illustrating the configuration of the face detection preprocessing unit 30. As illustrated in FIG. 3, the face detection preprocessing unit 30 includes a first frontal face detection unit 31 for mainly detecting a frontal face, a first left profile face detection unit 32 for mainly detecting a left profile face, and a first right profile face detection unit 33 for mainly detecting a right profile face. The first frontal face detection unit 31, left profile face detection unit 32 and right profile face detection unit 33 include classifiers 31a, 32a and 33a, respectively. In each of the classifiers, a plurality of weak classifiers WCi (i=1 through N) is linearly combined to form a cascade structure.

Figure 5:
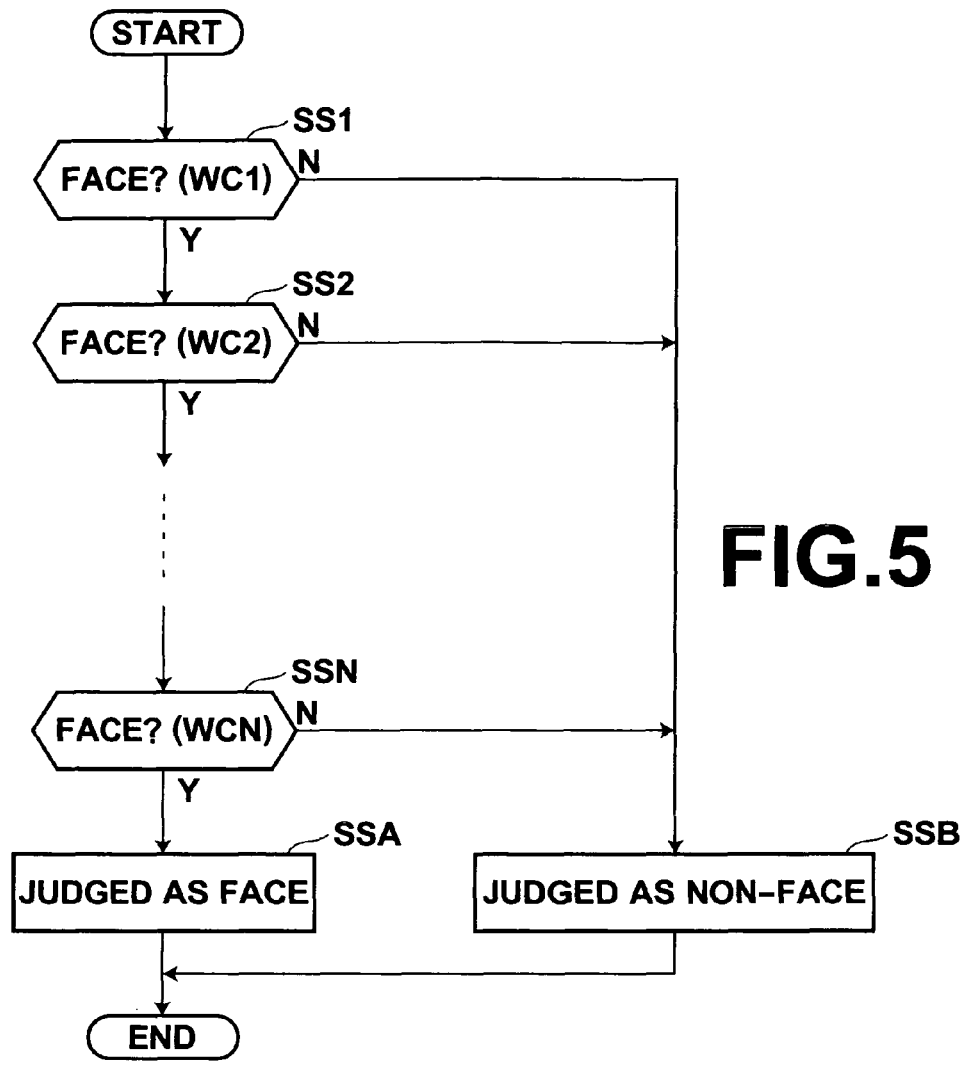
FIG. 5 is a flow chart of overall processing by a classifier.
Figure 6:
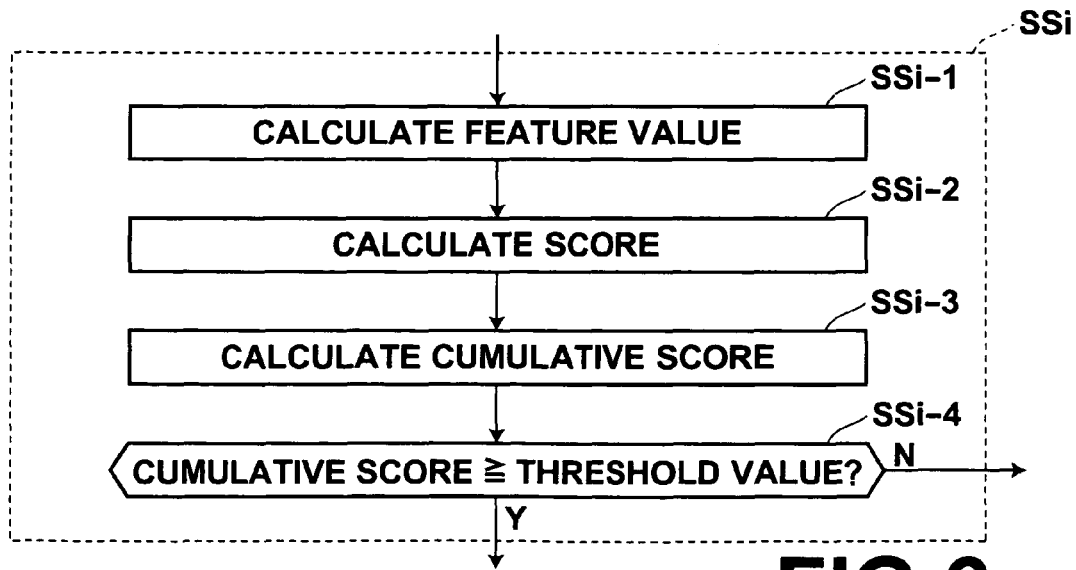
FIG. 6 is a flow chart of processing by a weak classifier.

FIG. 5 is a flow chart of overall processing by each of the classifiers. FIG. 6 is a flow chart of processing by each of the weak classifiers in each of the classifiers.

Figure 7:
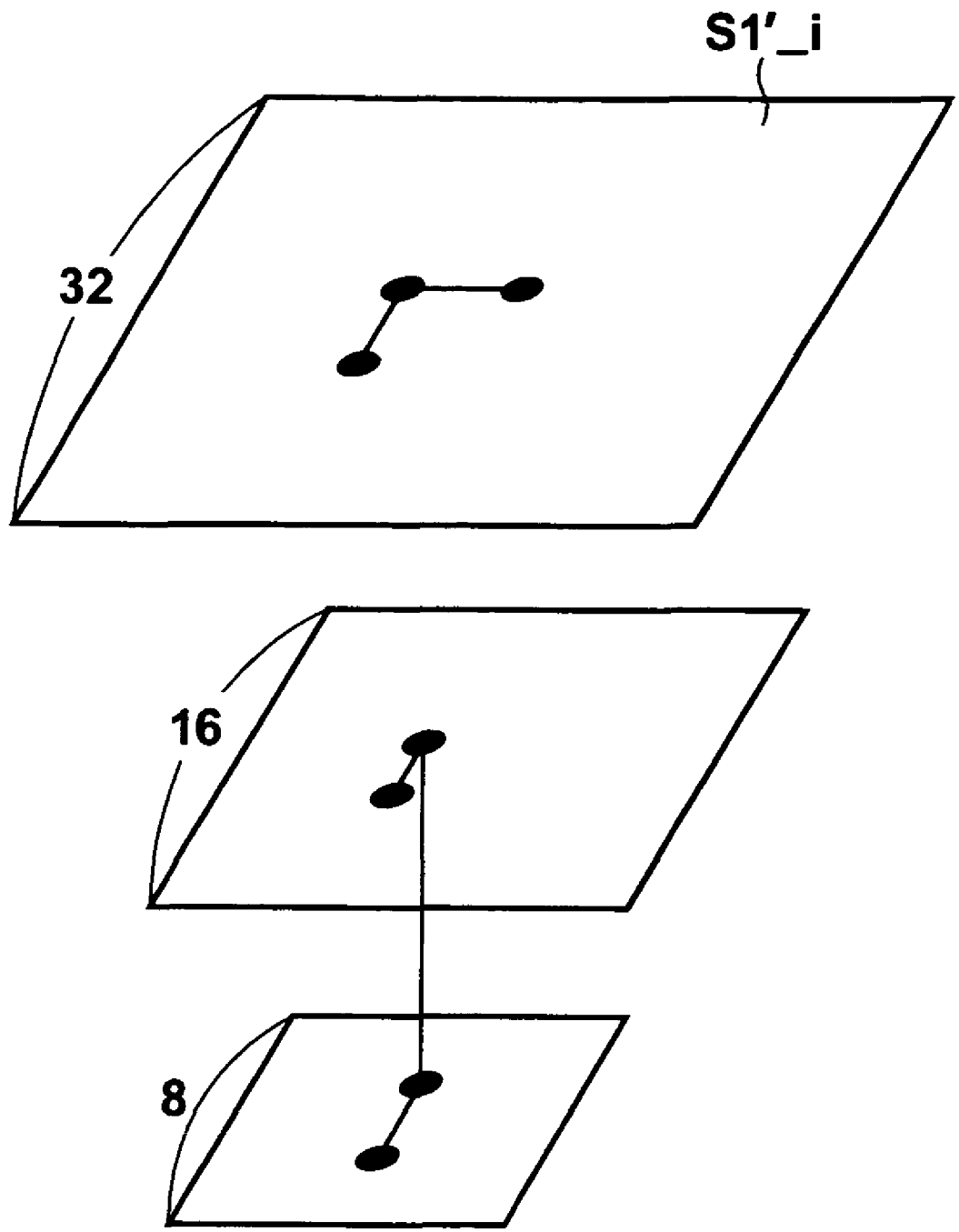
FIG. 7 is a diagram for explaining calculation of a feature value by the weak classifier.

First, a first weak classifier WC1 classifies a partial image which has a predetermined size, and which has been extracted from each of the multiple resolution images S1'_i, by judging whether the partial image is an image representing a face (step SS1). Specifically, as illustrated in FIG. 7, the weak classifier WC1 performs four neighboring pixel averaging on a partial image which has been extracted from each of the multiple resolution images S1'_i, and which has a predetermined size. The predetermined size is, for example, 32×32 pixels. Accordingly, a reduced image which has a size of 16×16 pixels and a reduced image which has a size of 8×8 pixels are obtained. The weak classifier WC1 uses predetermined two points which are set on a plane of each of the three images as a pair of points. The weak classifier WC1 calculates a difference value in luminance between two points in each of pairs forming a set of pairs. The set of pairs includes a plurality of kinds of pairs. Here, a combination of the difference values is used as a feature value (step SS1-1). The predetermined two points in each of the pairs are predetermined two points which are vertically or horizontally aligned, for example. The two points are determined so that the characteristic feature in the density of a face in the image is reflected in the points. Then, a score is calculated based on the combination of difference values, which is the feature value, with reference to a predetermined score table (step SS1-2). The score calculated by the weak classifier is added to a score calculated by a preceding weak classifier to obtain a cumulative score (step SS1-3). However, if the weak classifier is the first weak classifier WC1, no preceding weak classifier is present. Therefore, the score calculated by the weak classifier WC1 is used as the cumulative score. Then, judgment is made as to whether the cumulative score is higher than or equal to a predetermined threshold value. Further, judgment is made, based on the judgment on the cumulative score, as to whether the partial image is a facial image (step SS1-4). Here, if the partial image is classified as a facial image, processing goes to processing by the next weak classifier WC2 (step SS2). If the partial image is classified as a non-facial image, the partial image is immediately judged as a non-facial image (step SSB), and processing ends.

In step SS2, the weak classifier WC2 calculates, based on a partial image, a feature value of an image, as described above, in a manner similar to step SS1 (step SS2-1). The feature value is a value representing a characteristic feature of the image. Then, the weak classifier WC2 calculates a score based on the feature value with reference to a score table (step SS2-2). Then, the score calculated by the weak classifier WC2 is added to the cumulative score calculated by the preceding weak classifier WC1, and updates the cumulative score (step SS2-3). Judgment is made as to whether the cumulative score is higher than or equal to a predetermined threshold value. Judgment as to whether the partial image is a facial image is made based on the above judgment result on the cumulative score (step SS2-4). Here, if the partial image is classified as a facial image, processing goes to processing by the next weak classifier WC3 in a manner similar to the processing by the first weak classifier WC1 (step SS3). If the partial image is classified as a non-facial image, the partial image is immediately judged as a non-facial image (step SSB), and processing ends. Then, if the partial image is classified as a facial image by all of N number of weak classifiers, the partial image is finally extracted as a face candidate (step SSA).

Figure 8:
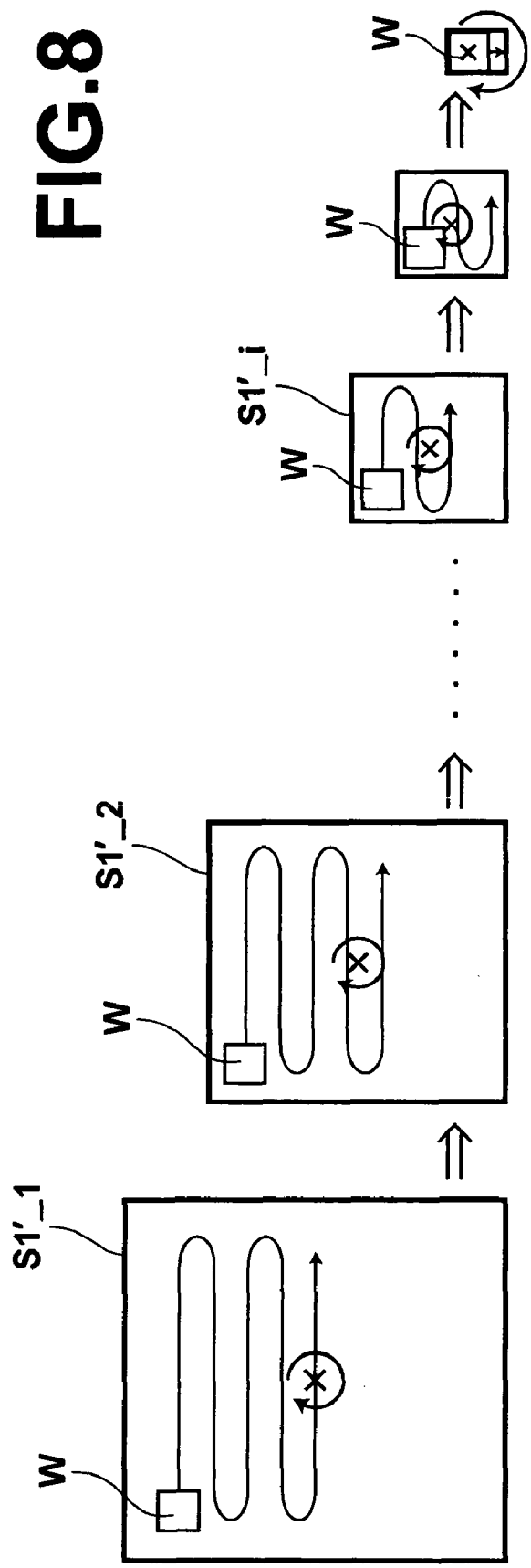
FIG. 8 is a diagram for explaining rotation of each of a plurality of multiple resolution images and movement of a sub-window.

In each of the face detection units 31 through 33, a unique classifier including a plurality of weak classifiers is used. The type of a feature value, a score table and a threshold value are set for each of the plurality of weak classifiers. Each of the face detection units 31 through 33 detects faces in a specific direction, which should be classified thereby, namely frontal faces, left profile faces or right profile faces, using its own classifier. Further, the face detection units 31 through 33 perform classification processing on the partial image, as described above. As illustrated in FIG. 8, each of the multiple resolution images S1'_i is rotated 360 degrees on the plane thereof. While the image is rotated, a sub-window W for extracting a partial image which has a size of 32×32 pixels is set in each of the multiple resolution images S1'_i. Then, the sub-window W is moved by a predetermined number of pixels, for example, 5 pixels each time in each of the multiple resolution images S1'_i. Judgment is made as to whether the partial image extracted by using the sub-window is a facial image. Accordingly, in each of the multiple resolution images S1'_i, frontal faces, left profile faces and right profile faces at all rotation angles in the plane are detected, and face candidates S2 are output. A classifier for detecting a diagonally right-side face and a classifier for detecting a diagonally right-side face may be also provided to increase the accuracy in detection of faces in diagonal directions. However, the classifiers specialized in detection of diagonally left-side faces or diagonally right-side faces are not provided in the present embodiment.

Figure 4:
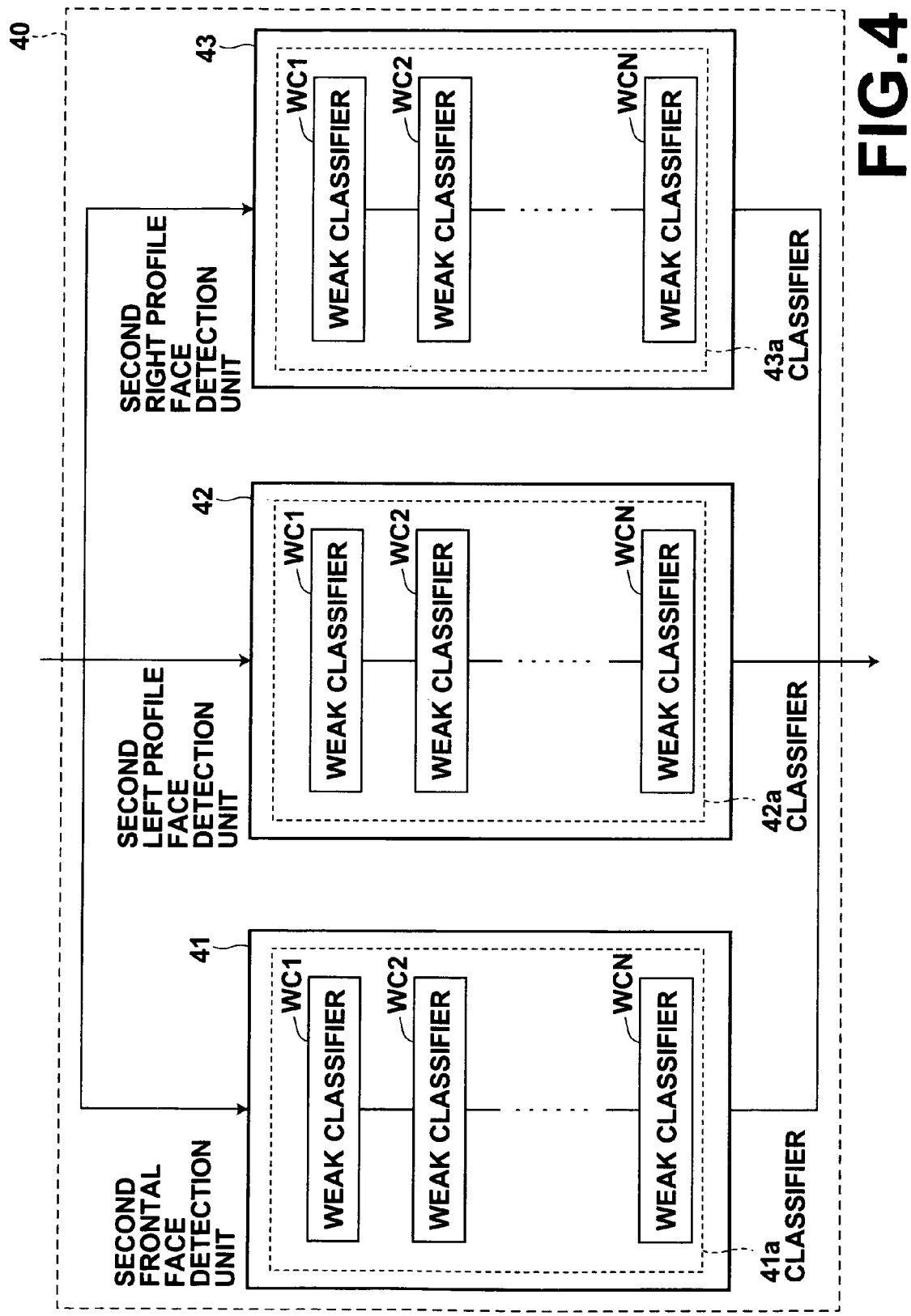
FIG. 4 is a block diagram illustrating the configuration of a face detection post-processing unit 40.

The face detection post-processing unit 40 performs relatively accurate face detection processing on neighboring images of each of the face candidates S2, extracted by the face detection preprocessing unit 30, to detect a true face S3 from the neighboring images of the face candidate. The configuration of the face detection post-processing unit 40 is basically the same as that of the face detection preprocessing unit 30. As illustrated in FIG. 4, the face detection post-processing unit 40 includes a second frontal face detection unit 41 for mainly detecting a frontal face, a second left profile face detection unit 42 for mainly detecting a left profile face, and a second right profile face detection unit 43 for mainly detecting a right profile face. The second frontal face detection unit 41, left profile face detection unit 42 and right profile face detection unit 43 include classifiers 41a, 42a or 43a, respectively. In each of the classifiers 41a, 42a or 43a, a plurality of weak classifiers WCi (i=1 through N) is linearly combined to form a cascade structure. It is preferable that the accuracy of each of the classifiers in the face detection post-processing unit 40 is higher than that of each of the classifiers in the face detection preprocessing unit 30. The flow of overall processing by each of the classifiers and the flow of processing by each of the weak classifiers in the face detection post-processing unit 40 are basically the same as those in the face detection preprocessing unit 30. However, in the face detection post-processing unit 40, a position in which the sub-window W is set is limited to a predetermined region including the face candidate S2 extracted by the face detection preprocessing unit 30. Further, a distance of each movement of the sub-window W in the face detection post-processing unit 40 is less than that of each movement of the sub-window W in the face detection preprocessing unit 30. The distance of each movement of the sub-window W in the face detection post-processing unit 40 is, for example, one pixel. Accordingly, refined detection processing is performed on the face candidate S2 which has been roughly extracted by the face detection preprocessing unit 30 to detect a true face S3, and only the true face S3 is output.

The duplicate detection judgment processing unit 50 performs processing, based on the position information of the image S3 in each of the multiple resolution images S1'_i. The image S3 is an image detected by the face detection post-processing unit 40. If the same face is detected in a plurality of multiple resolution images, in other words, if duplicate faces are detected, the duplicate detection judgment processing unit 50 reduces the number of the duplicate faces to one by canceling the same faces except one. Then, the duplicate detection judgment processing unit 50 outputs position information of the face S3' detected in the input image S0. Generally, the size of a face which can be detected in a partial image by each classifier depends on a method of learning. However, the size of a face which can be detected is not a single size but a certain range of sizes for each size of the partial image. Therefore, in some cases, the same face is detected in duplicate in a plurality of multiple resolution images, of which the resolutions are adjacent to each other.

Figure 9:
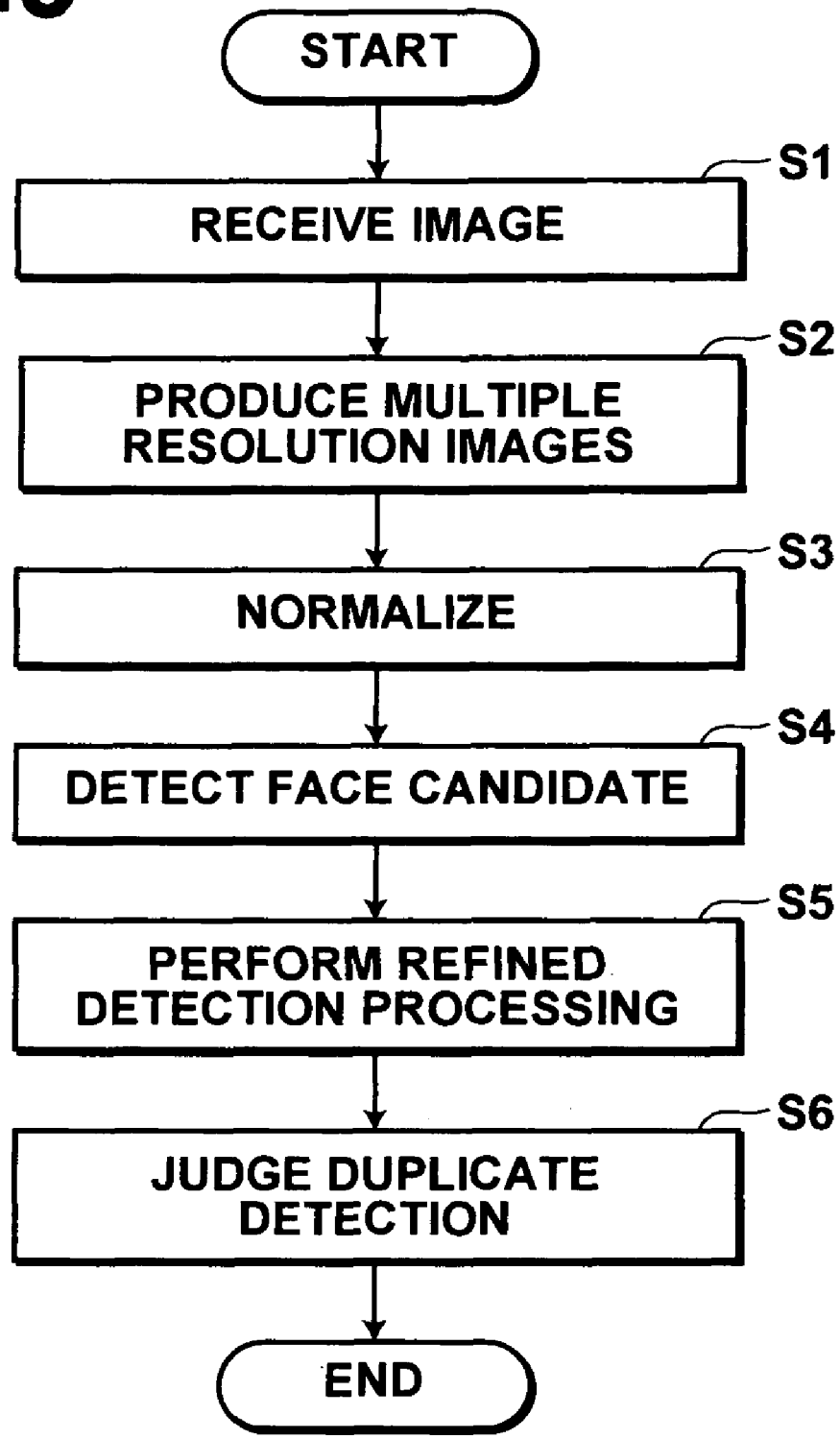
FIG. 9 is a flow chart of processing by the face detection system 1.

FIG. 9 is a flow chart of processing in the face detection system, as described above. As illustrated in FIG. 9, when an input image S0 is input to the multiple resolution image production unit 10 (step S1), an image S1 is produced by changing the image size of the input image S0 to a predetermined size. Then, a plurality of multiple resolution images S1_i is produced from the image S1 by sequentially reducing the resolution of the image S1 at a magnification factor of 2 to the power $-1/3$. (step S2). Then, the image normalization unit 20 normalizes the luminance variance in each of the multiple resolution images S1_i to obtain each of normalized multiple resolution images S1'_i (step S3). The face detection preprocessing unit 30 roughly extracts a face candidate S2 from each of the multiple resolution images S1'_1 using the classifiers 31*a*, 32*a* and 33*a* for detecting frontal faces, right profile faces and left profile faces, respectively (step S4). Further, the face detection post-processing unit 40 performs accurate face detection processing on the neighboring images of the face candidate S2 extracted in step S4. The face detection post-processing unit 40 performs processing using the classifiers 41*a*, 42*a* and 43*a* for detecting frontal faces, right profile faces and left profile faces, respectively, in a manner similar to processing by the face detection preprocessing unit 30. Accordingly, the face detection post-processing unit 40 performs refined detection processing on the face candidate S2 to obtain a true face S3 (step S5). Then, processing is performed to judge whether the same face is detected in a plurality of multiple resolution images S1'_i (step S6). If the same face is detected in a plurality of multiple resolution images S1'_i, in other words, if duplicate faces are detected, the number of the duplicate faces is reduced to one so that only one face is used among the duplicate faces. Then, the remained image is used as a finally detected face S3'.

Figure 10:
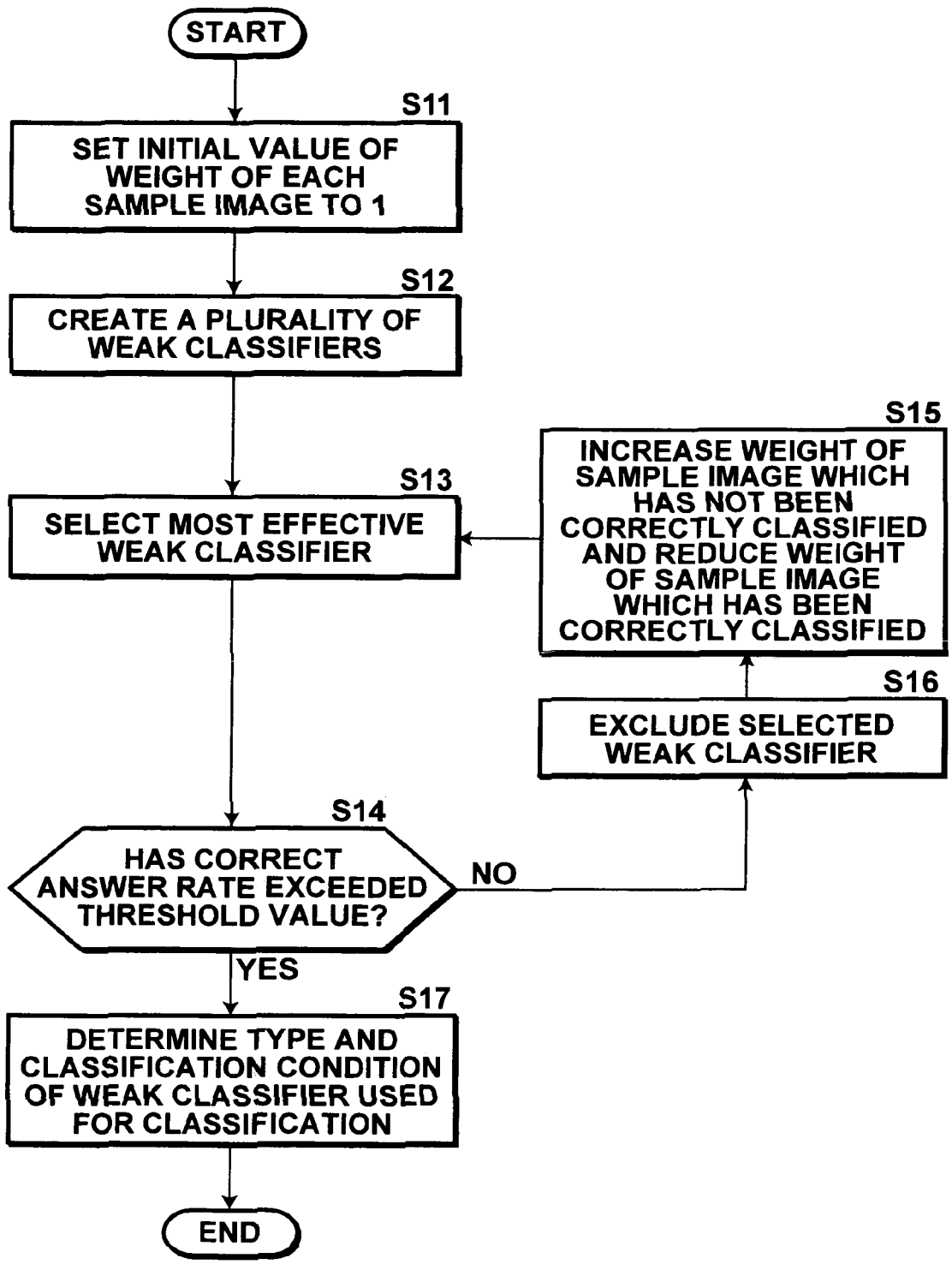
FIG. 10 is a flow chart illustrating a method of learning by a classifier.

Next, a method of learning of the classifiers will be described. FIG. 10 is a flow chart illustrating the method of learning by the classifiers. Here, learning is performed for each type of classifier, in other words, for each direction of a face to be detected.

A set of sample images, which is an object of learning, includes a plurality of sample images which are recognized as facial images and a plurality of sample images which are recognized as non-facial images. Both of the sample images are standardized images which have a predetermined size, for example, 32×32 pixels. As the sample images which are recognized as facial images, sample images, each including a face of which the direction is the same as the direction of a face to be classified by each of the classifiers, and of which the angle of inclination is the same as that of a face included in each of the other sample images, are used. A plurality of transformed images is produced from a single sample image and used as the sample images which are recognized as facial images. The plurality of transformed images is produced by vertically and/or horizontally enlarging or reducing the single sample image stepwise at a magnification factor within the range of 0.7 through 1.2. The magnification factor is changed in increments or decrements of 0.1. Further, each of the enlarged or reduced sample images is rotated stepwise by 3 degrees within the range of ±15 degrees in the plane. Accordingly, a plurality of transformed images is obtained. Then, weight, namely, a degree of importance is assigned to each of the sample images. The initial value of weight for each of all the sample images is equally set to 1 at first (step S11).

Next, a weak classifier is created for each of a plurality of types of sets of pairs. Each of the plurality of types of sets of pairs includes a plurality of pairs, and each of the plurality of pairs includes predetermined two points, which are set in the plane of the sample image or reduced images of the sample image (step S12). Here, each weak classifier provides a criterion for classifying images into facial images or non-facial images. Each weak classifier uses a combination of difference values in luminance between two points in each of pairs which form a single set of pairs. The single set of pairs includes a plurality of pairs. Each of the plurality of pairs includes predetermined two points set in a plane of the partial image extracted by using a sub-window W or in a plane of each of reduced images of the partial image. In the present embodiment, a histogram about the combination of difference values of luminance between two points in each of the pairs, which form a set of pairs, is used as a basis for a score table of the weak classifier.

Figure 11:
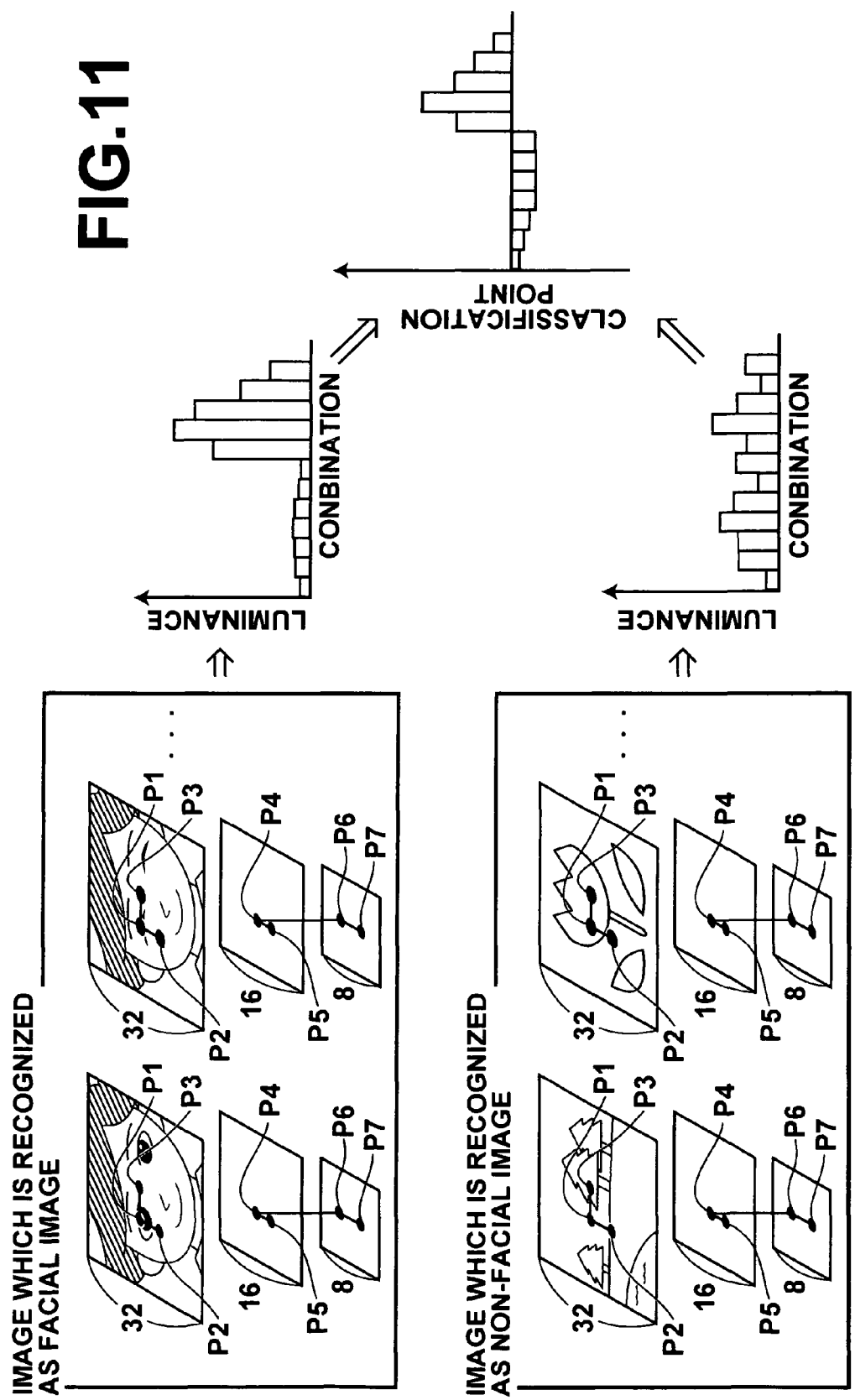
FIG. 11 is a diagram for deriving a histogram of the weak classifier.

Creation of a classifier will be described with reference to FIG. 11. As illustrated in the sample images on the left side of FIG. 11, pairs in a set of pairs, which are used to create the classifier, are five pairs, namely P1-P2, P1-P3, P4-P5, P4-P6 and P6-P7 in each of a plurality of sample images which are recognized as facial images. In each of a plurality of sample images which are recognized as facial images, point P1 is a point at the center of the right eye. Point P2 is a point in a right cheek in the sample image. Point P3 is a point in a region between the eyebrows. Further, in a reduced image which has a size of 16×16 pixels, and which is produced by performing four neighboring pixel averaging on the sample image, points P4 and P5 are used. The point P4 is a point at the center of the right eye in the reduced image of 16×16 pixels. The point P3 is a point in a right cheek in the reduced image of 16×16 pixels. Further, in a reduced image which has a size of 8×8 pixels, and which is produced by further performing four neighboring pixel averaging on the image which has the size of 16×16 pixels, points P6 and P7 are used. The point P6 is a point in a forehead in the reduced image of 8×8 pixels. The point P7 is a point in a mouth region in the reduced image of 8×8 pixels. Here, two points in each of the pairs forming a set of pairs are points used for creating the classifier and the coordinate positions of the two points in each of the pairs are the same in all of the sample images. For all of the sample images which are recognized as facial images, a combination of difference values of luminance between two points in each of pairs, which form the five pairs as described above, is obtained, and a histogram of the combination is created. Here, a possible value of the number of combinations of difference values of luminance depends on the number of gradation of luminance of the image. If the gradation is 16 bit gradation, the number of combinations is 65,536 for each difference value of luminance. Therefore, in total, the number of combinations is the number of gradation to the power the number of pairs, namely 65,536 to the power 5. Therefore, a large number of samples, long time and large memory are required for both learning and detection. Therefore, in the present embodiment, the difference values of luminance are quantized in increments of an appropriate numerical value. Accordingly, the difference values of luminance are expressed by n values (for example, n=100).

Accordingly, the number of combinations of difference values of luminance becomes n to the power 5. Therefore, the number of sets of data for representing the combinations of difference values of luminance can be reduced.

Similarly, a histogram is also created for the plurality of sample images which are recognized as non-facial images. In the sample images which are recognized as non-facial images, points corresponding to the predetermined two points in each of the pairs in the sample images which are recognized as faces are used (the same reference numerals P1 thorough P7 are used). Logarithms of the ratios of luminance values represented by the two histograms are obtained. The logarithms are represented in a histogram at the right end of FIG. 11. This histogram is used as a basis for a score table of a weak classifier. Hereinafter, each value on the vertical axis of the histogram of the weak classifier is referred to as a classification point. In this weak classifier, if the combinations of difference of luminance of an image are distributed in a range corresponding to positive classification points, a possibility that the image is a facial image is high. Further, if the absolute value of the classification point is higher, the possibility is even higher. In contrast, if the combinations of difference of luminance of an image are distributed in a range corresponding to negative classification points, a possibility that the image is a non-facial image is high. Further, if the absolute value of the classification point is higher, the possibility is even higher. In step S12, a plurality of histogram-type weak classifiers, as described above, are created for the combinations of difference values between predetermined two points in each of pairs which form a plurality of types of sets of pairs, which are used for classification.

Then, the most effective weak classifier for classifying whether an image is a facial image is selected from the plurality of weak classifiers, created in step S12. The weight assigned to each of the sample images is considered during selection of the most effective weak classifier. In this example, weighted correct answer rates of the weak classifiers are compared with each other, and a weak classifier which has the highest weighted correct answer rate is selected as the most effective weak classifier (step S13). Specifically, in the first step S13, since the weight of each of the sample images is equally set to 1, a weak classifier which can correctly judge a largest number of images as to whether each of the images is a facial image is simply selected as the most effective weak classifier. Meanwhile, in the second step S13, which is performed after the weight of each of the sample images is updated in step S15, which will be described later, weight is set to 1 for some of the sample images, and weight is set to a value larger than 1 for some of the sample images. Further, weight is set to a value lower than 1 for the other sample images. Therefore, in evaluation of the correct answer rate, when the number of images which are correctly judged is counted, the sample images in which the weight is set to a value larger than 1 are weighted. Accordingly, in the second or later step S13, correct classification of sample images which have higher weight is more important than correct classification of sample images which have lower weight.

Next, judgment is made as to whether the correct answer rate by the combination of weak classifiers which have been selected has exceeded a predetermined threshold value. The correct answer rate is a concordance rate between a result of classification and a correct answer as to whether the image is a facial image. Further, the result of classification is a result obtained by classifying each of the sample images to judge whether each of the sample images is a facial image using the combination of weak classifiers which have been selected (in the process of learning, it is not always necessary that the weak classifiers be linearly combined). Accordingly, it is possible to confirm whether the concordance rate between the result of classification and the correct answer has exceeded the predetermined threshold value (step S14). Here, when the correct answer rate for the combination of the weak classifiers is evaluated, either a set of sample images in which present weight is applied or a set of sample images in which the same weight is applied to all of the sample images may be used. If the concordance rate exceeds the predetermined threshold value, it is possible to classify, at sufficiently high probability, whether an image is a facial image by using the weak classifiers which have been selected. Therefore, learning ends. If the concordance rate is less than or equal to a predetermined threshold value, processing goes to step S16 so as to select an additional weak classifier which will be used in combination with the weak classifiers which have been selected.

In step S16, the weak classifier which was selected in the preceding step S13 is excluded so that the same weak classifier is not selected.

Next, if a sample image is not correctly classified as to whether the sample image is a facial image by the weak classifier which was selected in the preceding step S13, weight applied to the sample image is increased. If a sample image is correctly classified as to whether the sample image is a facial image, weight applied to the sample image is reduced (step S15). The value of weight is changed, as described above, so that a weak classifier which can correctly classify the image, which has not been correctly classified by the weak classifiers which have been selected, is selected as the next weak classifier. Accordingly, the efficiency of the combination of the weak classifiers can be improved.

Then, processing goes back to step S13, and the second most effective weak classifier is selected based on the weighted correct answer rate, as described above.

The steps S13 through S16, as described above, are repeated, and a weak classifier corresponding to the combination of difference values of luminance between predetermined two points in each of pairs which form a specific set of pairs is selected as an appropriate weak classifier for classifying whether an image is a facial image. Then, if the correct answer rate confirmed in step S14 exceeds a threshold value, the type of weak classifier which is used for classifying whether the image is a facial image and a classification condition are determined (step S17), and learning ends. The selected weak classifiers are linearly combined in descending order of correct answer rates, and a single classifier is formed. Further, a scare table for calculating scores based on the combinations of difference values of luminance is generated for each of the weak classifiers. The score table is generated based on the histogram obtained for each of the weak classifiers. The histogram, itself, may be used as the score table. In that case, the classification point in the histogram is directly used as a score.

When the method of learning, as described above, is adopted, the weak classifier is not limited to the histogram-type classifier, as described above. A different type of weak classifier may be used as far as the weak classifier can provide a criterion for classifying an image into a facial image or a non-facial image using the combination of difference values of luminance between predetermined two points in each of pairs forming a specific set of pairs. For example, the weak classifier may be binary data, a threshold value, a function, or the like. Further, even if the weak classifier is a histogram-type classifier, a histogram representing a distribution of difference values between two histograms, illustrated at the center of FIG. 11, may be used.

Further, the method of learning is not limited to the method as described above. Other machine-learning methods, such as neural network learning, may be adopted.

Characteristic regions of images which should be learned by classifiers differ from each other according to the direction of the face to be classified by a classifier and the type of processing in face detection processing in which the classifier is used. Here, how the characteristic regions are different according to the direction of the face to be classified and the type of processing in face detection processing will be described.

Figure 12:
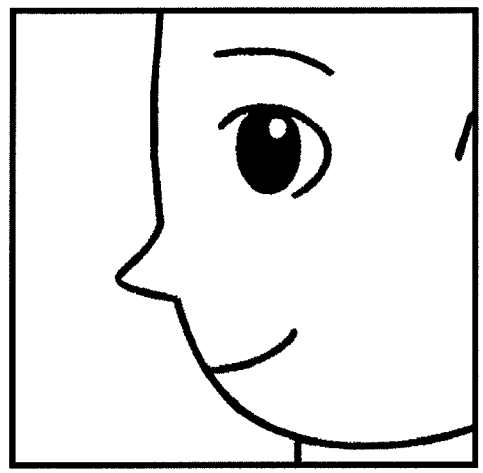
FIG. 12 is an example of a sample image of a facial region including the entire facial contour of a profile face.

First, a case in which faces to be classified are profile faces will be described. The characteristic features of images of profile faces are that a relatively large background region is present besides a face and that the shape of the contour of a jaw is relatively sharp. Therefore, it is important to cause the classifiers 32a, 33a, 42a and 42a for classifying profile faces to learn these characteristic features of the profile faces, namely presence of a relatively large background and the shape of the contour of the jaw. The sample images representing faces must appropriately include these characteristic features of the profile faces to cause the classifiers to learn the characteristic features. For example, as illustrated in FIG. 12, the sample images representing faces may be limited to images of a region including an entire facial contour. In the sample image of the profile face, it is preferable that a facial contour in each the profile faces is positioned substantially at the center of the image so that the characteristic region included in the image is arranged in a well-balanced manner.

Next, a case in which faces to be classified are frontal faces will be described. The characteristic features of images representing the frontal faces are that both eyes, a nose and a mouth are present and that the shape of a facial contour is round. However, in the frontal faces, the shape of the mouth is transformed by a change in facial expressions. The shape of the mouth is transformed, for example, when the mouth is horizontally stretched or widely opened. The shape of the mouth is transformed by a change in facial expressions, and the degree of transformation is particularly large in a region below an upper lip.

Figure 13:
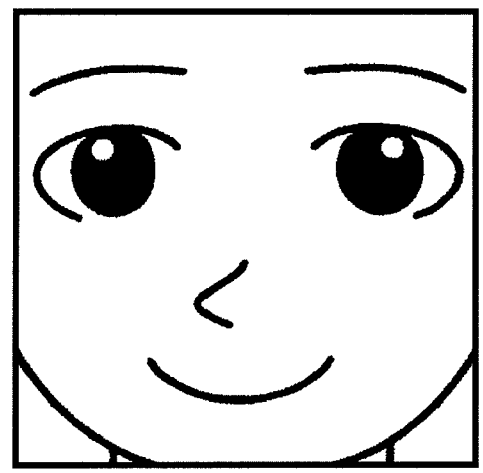
FIG. 13 is an example of a sample image of a facial region including the entire facial contour of a frontal face.

Therefore, in processing such as processing by the classifier 31a in the face detection preprocessing unit 30, it is important to cause the classifier to learn the round shape of the face so as to extract all the face candidates without failure. The processing by the classifier 31a in the face detection preprocessing unit 30 is processing in which the face to be classified is a frontal face, and in which the type of processing in face detection processing, in which the classifier is used, is preprocessing in face detection processing including the preprocessing for extracting a face candidate and post-processing for performing refined detection processing on the extracted face candidate to obtain a true face. The round shape of the face is the simplest characteristic feature of the frontal face, which is common to all of the frontal faces. The sample images representing faces must appropriately include these characteristic features to cause the classifiers to learn these characteristic features. For example, as illustrated in FIG. 13, the sample images representing faces may be limited to images of a region including the entire facial contour.

Figure 14:
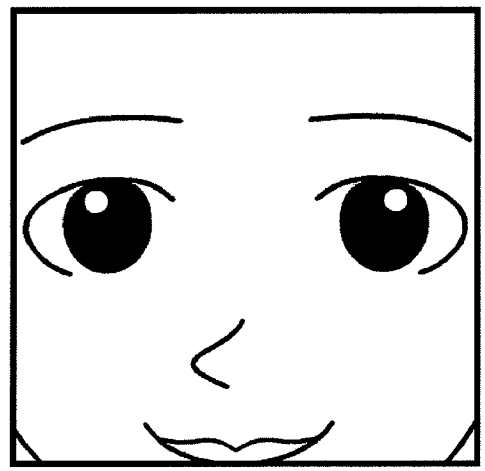
FIG. 14 is an example of a sample image of a facial region including only both eyes, a nose and an upper lip.

Further, in processing such as the processing by the classifier 41a in the face detection post-processing unit 40, it is important to cause the classifier to mainly learn the presence of both eyes, a nose and an upper lip to suppress influence from various kinds of transformation in a region of the mouth and to improve the accuracy of classification. In the processing by the classifier 41a in the face detection post-processing unit 40, the face to be classified is a frontal face, and the type of processing in face detection processing, in which the classifier is used, is post-processing in face detection processing including preprocessing and the post-processing. In face detection processing, the preprocessing is processing for extracting a face candidate and the post-processing is processing for performing refined detection processing on the extracted face candidate. In processing such as the processing by the classifier 41a in the face detection post-processing unit 40, the sample images representing faces must appropriately include these characteristic features, namely the presence of both eyes, a nose and an upper lip, to cause the classifiers to learn the characteristic features. For example, as illustrated in FIG. 14, the sample images representing faces may be limited to images of a region including only both eyes, a nose and an upper lip. Alternatively, the sample images representing faces may be limited to images of a region including the entire facial contour, as illustrated in FIG. 13, and images of a region including only both eyes, a nose and an upper lip, as illustrated in FIG. 14.

Here, the term "facial contour" refers to a contour excluding both the contour of the head (including an occiput) and the contour of the neck. If the image is an image representing a frontal face, a facial contour is a line connecting a right temple, a jaw and a left temple. If the image is an image representing a profile face, a facial contour is a line connecting a forehead, a nose and a chin.

As described above, in the face detection system according to a first embodiment of the present invention, when learning is performed by the face classification apparatus (classifier), facial images for learning, each including a face, of which the direction and angle of inclination are the same as those of each of faces included in the other facial images for learning, are used. Further, the facial region of each of the sample images representing faces is limited to a predetermined facial region for each type of sample images based on the characteristic regions of the images, which should be learned. Therefore, it is possible to appropriately include a characteristic region of the image, which should be learned, in each of the sample images. Further, it is possible to prevent each of the sample images representing faces from including different characteristic features from each others. Therefore, it is possible to provide the face classification apparatus (classifier), which has accurately learned the characteristic features of the images, which should be primarily learned.

Next, a face detection system according to a second embodiment of the present invention will be described.

The configuration of this face detection system is the same as that of the face detection system, illustrated in FIG. 1. The function of each component in this face detection system is basically the same as that of each component in the face detection system according to the first embodiment. However, sample images used for learning by the classifiers in the second embodiment are different from those used in the first embodiment.

Specifically, in this face detection system, images including faces, of which the angles of inclination and the directions are same time, in this face detection system, images which satisfy one of the following conditions are used as the sample images:

(1) an image of a region including only an eye or eyes and a nose;

(2) an image of a region including only an eye or eyes, a nose and an upper lip; or (3) mixture of the above items (1) and (2), namely an image of a region including only an eye or eyes and a nose or an image of a region including only an eye or eyes, a nose and an upper lip.

Figure 15A:
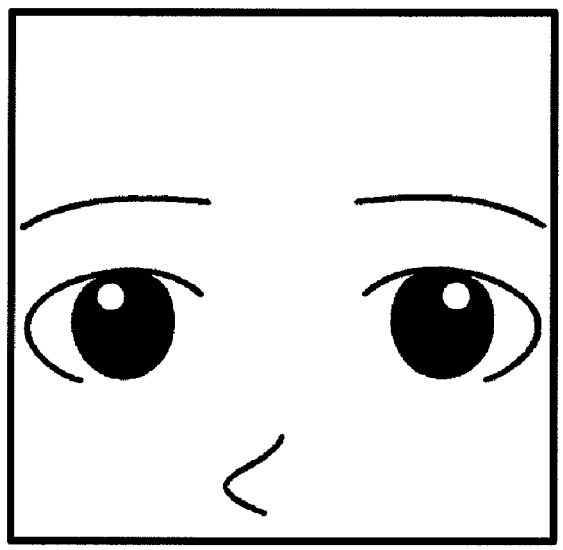
FIG. 15A is an example of a sample image of a facial region including only both eyes and a nose in a frontal face.
Figure 15B:
FIG. 15B is an example of a sample image of a facial region including only an eye or eyes and a nose in a profile face.
Figure 16A:
FIG. 16A is an example of a sample image of a facial region including only an eye or eyes, a nose and an upper lip in a frontal face.
Figure 16B:
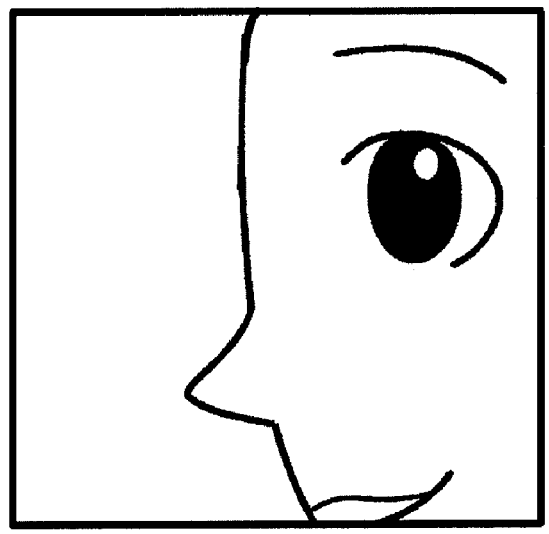
FIG. 16B is an example of a sample image of a facial region including only an eye or eyes, a nose and an upper lip in a profile face.

FIG. 15A is a diagram illustrating an example of an image of a frontal face, corresponding to the above item (1). FIG. 15B is a diagram illustrating an example of an image of a profile face, corresponding to the above item (1). FIG. 16A is a diagram illustrating an example of an image of a frontal face, corresponding to the above item (2). FIG. 16B is a diagram illustrating an example of an image of a profile face, corresponding to the above item (2).

Since the images, as described above, are used as the sample images, it is possible to cause the classifier to learn characteristic features of a face mainly using a region other than a region around the mouth. Particularly, it is possible to exclude a region below the upper lip, which is easily transformed by a change in facial expressions. Consequently, it is possible to provide a classifier which is not influenced by a change in facial expressions. In a sample image representing a profile face, it is preferable that a facial contour of the profile face is positioned substantially at the center of the image so that the characteristic region included in the image is arranged in a well-balanced manner.

As described above, in the face detection system according to the second embodiment of the present invention, when learning is performed by the face classification apparatus (classifier), sample images, each including a face, of which the direction and angle of inclination are the same as those of faces included in each of the other sample images are used. Further, the sample images are limited to images of a predetermined facial region including only particular facial parts other than a region below an upper lip. Therefore, it is possible to appropriately include a characteristic region of the image other than a region around a chin, which is easily transformed by a change in facial expressions, in the sample images representing faces. Further, it is possible to prevent a plurality of images representing faces from including different characteristic features from each other. Since learning is performed using the sample images, as described above, it is possible to perform face classification processing which is not influenced by a change in facial expressions. Further, it is possible to perform face classification processing which is not influenced by a loss of a mouth region, presence of a beard or the like. For example, when a group photograph is taken, if his/her mouth is blocked by a person's head in front of him/her, the region of his/her mouth is lost.

Here, for the sake of convenience, it is preferable that each of all the facial regions of the sample images representing faces is a rectangular region.

So far, the face detection systems, which are embodiments of the face classification apparatuses according to the present invention and embodiments of the methods of learning by the face classification apparatuses, have been described. However, a program for causing a computer to perform each processing by the face classification apparatus (classifier) according to the present invention is also an embodiment of the present invention. Further, a computer readable recording medium stored therein the program is also an embodiment of the present invention.

What is claimed is:

1. A learning method for causing a face classification apparatus to learn a characteristic feature of faces, wherein the face classification apparatus is an apparatus for classifying whether an input image is a facial image including a face which has a predetermined direction and a predetermined angle of inclination, wherein the characteristic feature of faces is learned by using a machine-learning method using a plurality of facial images for learning, which are different from each other, and each of which includes a face which has the predetermined direction and the predetermined angle of inclination, said learning method comprising the steps of:

setting initial value of weight for each of all sample images to 1, said sample images includes said facial images for learning and plural images which are recognized as non-facial images;

creating plural weak classifiers;

selecting the most effective weak classifier from said plural weak classifiers;

comparing correct answer rate of the selected weak classifier and a predetermined threshold value;

determining type and classification condition of weak classifier used for classification, if the correct answer rate of the selected weak classifier has exceeded the predetermined threshold value; and excluding said selected weak classifier, increasing weight of sample image which has not been correctly classified and reducing weight of sample image which has been correctly classified, if the corrected answer rate of the selected weak classifier has not exceeded the predetermined threshold value;

wherein, in the step of creating plural weak classifiers, a weak classifier is created for each of a plurality of types of set of pairs, said each of the plurality of types of sets of pairs includes predetermined two points, which are set in the plane of the sample image of reduced images of the sample image, wherein each of said weak classifiers provides a criterion for classifying images into facial images or non-facial images by using a combination of difference values in luminance between two points in each of pairs which form a single set of pairs, said single set of pairs includes a plurality of pairs and said plurality of pairs includes predetermined two points set in a plane of the partial image extracted by using a sub-window or in a plane of each of reduced images of the partial image, and wherein the plurality of facial images for learning includes only images of a predetermined facial region and is determined so that characteristic features included in said plurality of facial images for learning are not different from each other.

2. A learning method of a face classification apparatus, as defined in claim 1, wherein the predetermined direction is a profile direction, and wherein the predetermined facial region is a region including an entire facial contour.

3. A learning method of a face classification apparatus, as defined in claim 1, wherein the predetermined direction is a frontal direction, and wherein the type of processing is preprocessing in face detection processing including the preprocessing for extracting a face candidate and post-processing for performing refined detection processing on the extracted face candidate, and wherein the predetermined facial region is a region including an entire facial contour.

4. A learning method of a face classification apparatus, as defined in claim 1, wherein the predetermined direction is a frontal direction, and wherein the type of processing is post-processing in face detection processing including preprocessing for extracting a face candidate and the post-processing for performing refined detection processing on the extracted face candidate, and wherein the plurality of facial images for learning are an image or images of a region including only both eyes, a nose and an upper lip and an image or images of a region including an entire facial contour.

5. A learning method of a face classification apparatus, as defined in claim 1, wherein the predetermined direction is a frontal direction, and wherein the type of processing is post-processing in face detection processing including preprocessing for extracting a face candidate and the post-processing for performing refined detection processing on the extracted face candidate, and wherein the predetermined facial region is a region including only both eyes, a nose and an upper lip.

6. A learning method of a face classification apparatus, as defined in claim 1, wherein the predetermined direction is a frontal direction, and wherein the type of processing is post-processing in face detection processing including preprocessing for extracting a face candidate and the post-processing for performing refined detection processing on the extracted face candidate, and wherein the predetermined facial region is a region including only both eyes and a nose.

7. A learning method of a face classification apparatus, as defined in claim 1, wherein the facial region is a rectangular region.

8. A learning method of a face classification apparatus, as defined in claim 1, wherein the face classification apparatus is formed by linearly combining a plurality of weak classifiers which are different from each other.

9. A learning method of a face classification apparatus, as defined in claim 1, wherein the machine-learning method is boosting.

10. A learning apparatus for causing a face classification apparatus to learn a characteristic feature of faces, wherein the face classification apparatus is an apparatus for classifying whether an input image is a facial image including a face which has a predetermined direction and a predetermined angle of inclination, wherein the characteristic feature of faces is learned by using a machine-learning method using a plurality of facial images for learning, which are different from each other, and each of which includes a face which has the predetermined direction and the predetermined angle of inclination, said learning apparatus comprising the means for:
  setting initial value of weight for each of all sample images to 1, said sample images includes said facial images for learning and plural images which are recognized as non-facial images;
  creating plural weak classifiers;
  selecting the most effective weak classifier from said plural weak classifiers;
  comparing correct answer rate of the selected weak classifier and a predetermined threshold value;
  determining type and classification condition of weak classifier used for classification, if the correct answer rate of the selected weak classifier has exceeded the predetermined threshold value; and
  excluding said selected weak classifier, increasing weight of sample image which has not been correctly classified and reducing weight of sample image which has been correctly classified, if the corrected answer rate of the selected weak classifier has not exceeded the predetermined threshold value;
  wherein, in the means for creating plural weak classifiers, a weak classifier is created for each of a plurality of types of set of pairs, said each of the plurality of types of sets of pairs includes predetermined two points, which are set in the plane of the sample image of reduced images of the sample image,
  wherein each of said weak classifiers provides a criterion for classifying images into facial images or non-facial images by using a combination of difference values in luminance between two points in each of pairs which form a single set of pairs, said single set of pairs includes a plurality of pairs and said plurality of pairs includes predetermined two points set in a plane of the partial image extracted by using a sub-window or in a plane of each of reduced images of the partial image, and
  wherein the plurality of facial images for learning includes only images of a predetermined facial region and is determined so that characteristic features included in said plurality of facial images for learning are not different from each other.

11. A computer readable recording medium having stored therein a program that causes a computer to perform processing for causing a face classification apparatus to learn a characteristic feature of faces, wherein the face classification apparatus is an apparatus for classifying whether an input image is a facial image including a face which has a predetermined direction and a predetermined angle of inclination, and wherein the characteristic feature of faces is learned by using a machine-learning method using a plurality of facial images for learning, which are different from each other, and each of which includes a face which has the predetermined direction and the predetermined angle of inclination, said learning method comprising the steps of:
  setting initial value of weight for each of all sample images to 1, said sample images includes said facial images for learning and plural images which are recognized as non-facial images;
  creating plural weak classifiers;
  selecting the most effective weak classifier from said plural weak classifiers;
  comparing correct answer rate of the selected weak classifier and a predetermined threshold value;
  determining type and classification condition of weak classifier used for classification, if the correct answer rate of the selected weak classifier has exceeded the predetermined threshold value; and
  excluding said selected weak classifier, increasing weight of sample image which has not been correctly classified and reducing weight of sample image which has been correctly classified, if the corrected answer rate of the selected weak classifier has not exceeded the predetermined threshold value;
  wherein, in the step of creating plural weak classifiers, a weak classifier is created for each of a plurality of types of set of pairs, said each of the plurality of types of sets of pairs includes predetermined two points, which are set in the plane of the sample image of reduced images of the sample image, wherein each of said weak classifiers provides a criterion for classifying images into facial images or non-facial images by using a combination of difference values in luminance between two points in each of pairs which form a single set of pairs, said single set of pairs includes a plurality of pairs and said plurality of pairs includes predetermined two points set in a plane of the partial image extracted by using a sub-window or in a plane of each of reduced images of the partial image, and wherein the plurality of facial images for learning includes only images of a predetermined facial region and is determined so that characteristic features included in said plurality of facial images for learning are not different from each other.

12. A face classification method using a face classification apparatus for classifying whether an input image is a facial image including a face which has a predetermined direction and a predetermined angle of inclination, wherein the face classification apparatus learns a characteristic feature of faces by using a machine-learning method using a plurality of facial images for learning, which are different from each other, and each of which includes a face which has the predetermined direction and the predetermined angle of inclination, said learning method comprising the steps of:

setting initial value of weight for each of all sample images to 1, said sample images includes said facial images for learning and plural images which are recognized as non-facial images;

creating plural weak classifiers;

selecting the most effective weak classifier from said plural weak classifiers;

comparing correct answer rate of the selected weak classifier and a predetermined threshold value;

determining type and classification condition of weak classifier used for classification, if the correct answer rate of the selected weak classifier has exceeded the predetermined threshold value; and excluding said selected weak classifier, increasing weight of sample image which has not been correctly classified and reducing weight of sample image which has been correctly classified, if the corrected answer rate of the selected weak classifier has not exceeded the predetermined threshold value;

wherein, in the step of creating plural weak classifiers, a weak classifier is created for each of a plurality of types of set of pairs, said each of the plurality of types of sets of pairs includes predetermined two points, which are set in the plane of the sample image of reduced images of the sample image, wherein each of said weak classifiers provides a criterion for classifying images into facial images or non-facial images by using a combination of difference values in luminance between two points in each of pairs which form a single set of pairs, said single set of pairs includes a plurality of pairs and said plurality of pairs includes predetermined two points set in a plane of the partial image extracted by using a sub-window or in a plane of each of reduced images of the partial image, and and wherein the plurality of facial images for learning includes only images of a predetermined facial region and is determined so that characteristic features included in said plurality of facial images for learning are not different from each other.

13. A face classification apparatus for classifying whether an input image is a facial image including a face which has a predetermined direction and a predetermined angle of inclination, wherein a characteristic feature of faces is learned by using a machine-learning method using a plurality of facial images for learning, which are different from each other, and each of which includes a face which has the predetermined direction and the predetermined angle of inclination, said learning method comprising the steps of:

setting initial value of weight for each of all sample images to 1, said sample images includes said facial images for learning and plural images which are recognized as non-facial images;

creating plural weak classifiers;

selecting the most effective weak classifier from said plural weak classifiers;

comparing correct answer rate of the selected weak classifier and a predetermined threshold value;

determining type and classification condition of weak classifier used for classification, if the correct answer rate of the selected weak classifier has exceeded the predetermined threshold value; and excluding said selected weak classifier, increasing weight of sample image which has not been correctly classified and reducing weight of sample image which has been correctly classified, if the corrected answer rate of the selected weak classifier has not exceeded the predetermined threshold value;

wherein, in the step of creating plural weak classifiers, a weak classifier is created for each of a plurality of types of set of pairs, said each of the plurality of types of sets of pairs includes predetermined two points, which are set in the plane of the sample image of reduced images of the sample image, wherein each of said weak classifiers provides a criterion for classifying images into facial images or non-facial images by using a combination of difference values in luminance between two points in each of pairs which form a single set of pairs, said single set of pairs includes a plurality of pairs and said plurality of pairs includes predetermined two points set in a plane of the partial image extracted by using a sub-window or in a plane of each of reduced images of the partial image, and and wherein the plurality of facial images for learning includes only images of a predetermined facial region and is determined so that characteristic features included in said plurality of facial images for learning are not different from each other.

14. A computer readable recording medium having stored therein a program that causes a computer to function as a face classification apparatus for classifying whether an input image is a facial image including a face which has a predetermined direction and a predetermined angle of inclination, wherein the face classification apparatus learns a characteristic feature of faces by using a machine-learning method using a plurality of facial images for learning, which are different from each other, and each of which includes a face which has the predetermined direction and the predetermined angle of inclination, said learning method comprising the steps of:

setting initial value of weight for each of all sample images to 1, said sample images includes said facial images for learning and plural images which are recognized as non-facial images;

creating plural weak classifiers;

selecting the most effective weak classifier from said plural weak classifiers;

comparing correct answer rate of the selected weak classifier and a predetermined threshold value;

determining type and classification condition of weak classifier used for classification, if the correct answer rate of the selected weak classifier has exceeded the predetermined threshold value; and excluding said selected weak classifier, increasing weight of sample image which has not been correctly classified and reducing weight of sample image which has been correctly classified, if the corrected answer rate of the selected weak classifier has not exceeded the predetermined threshold value;

wherein, in the step of creating plural weak classifiers, a weak classifier is created for each of a plurality of types of set of pairs, said each of the plurality of types of sets of pairs includes predetermined two points, which are set in the plane of the sample image of reduced images of the sample image, wherein each of said weak classifiers provides a criterion for classifying images into facial images or non-facial images by using a combination of difference values in luminance between two points in each of pairs which form a single set of pairs, said single set of pairs includes a plurality of pairs and said plurality of pairs includes predetermined two points set in a plane of the partial image extracted by using a sub-window or in a plane of each of reduced images of the partial image, and wherein the plurality of facial images for learning includes only images of a predetermined facial region and is determined so that characteristic features included in said plurality of facial images for learning are not different from each other.

15. A learning method according to claim 1, wherein said images of a predetermined facial region includes at least one of an image or images of a region including only an eye or eyes and a nose and an image or images of a region including only an eye or eyes, a nose and an upper lip and does not include any image of another region.

16. A learning method of a face classification apparatus, as defined in claim 15, wherein the plurality of facial images for learning includes only images of a region including only an eye or eyes and a nose.

17. A learning method of a face classification apparatus, as defined in claim 15, wherein the plurality of facial images for learning includes only images of a region including only an eye or eyes, a nose and an upper lip.

18. A learning method of a face classification apparatus, as defined in claim 15, wherein the plurality of facial images for learning includes only an image or images of a region including only an eye or eyes and a nose and an image or images of a region including only an eye or eyes, a nose and an upper lip.

19. A learning method of a face classification apparatus, as defined in claim 15, wherein the facial region is a rectangular region.

20. A learning method of a face classification apparatus, as defined in claim 15, wherein the face classification apparatus is formed by linearly combining a plurality of weak classifiers which are different from each other.

21. A learning method of a face classification apparatus, as defined in claim 15, wherein the machine-learning method is boosting.

22. A learning apparatus according to claim 10, wherein said images of a predetermined facial region includes at least one of an image or images of a region including only an eye or eyes and a nose and an image or images of a region including only an eye or eyes, a nose and an upper lip and does not include any image of another region.

23. A computer readable recording medium according to claim 11, wherein said images of a predetermined facial region includes at least one of an image or images of a region including only an eye or eyes and a nose and an image or images of a region including only an eye or eyes, a nose and an upper lip and does not include any image of another region.

24. A face classification method according to claim 12, wherein said images of a predetermined facial region includes at least one of an image or images of a region including only an eye or eyes and a nose and an image or images of a region including only an eye or eyes, a nose and an upper lip and does not include any image of another region.

25. A face classification apparatus according to claim 13, wherein said images of a predetermined facial region includes at least one of an image or images of a region including only an eye or eyes and a nose and an image or images of a region including only an eye or eyes, a nose and an upper lip and does not include any image of another region.

26. A computer readable recording medium according to claim 14, wherein said images of a predetermined facial region includes at least one of an image or images of a region including only an eye or eyes and a nose and an image or images of a region including only an eye or eyes, a nose and an upper lip and does not include any image of another region.

* * * * *